United States Patent
Speyer et al.

(10) Patent No.: US 8,377,369 B2
(45) Date of Patent: Feb. 19, 2013

(54) DENSITY AND HARDNESS PRESSURELESS SINTERED AND POST-HIPED $B_4C$

(75) Inventors: Robert F. Speyer, Atlanta, GA (US); Zhihao Bao, Atlanta, GA (US); Namtae Cho, Smyrna, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 1292 days.

(21) Appl. No.: 11/311,026

(22) Filed: Dec. 19, 2005

(65) Prior Publication Data
US 2007/0182073 A1    Aug. 9, 2007

Related U.S. Application Data

(60) Provisional application No. 60/647,471, filed on Jan. 27, 2005, provisional application No. 60/638,077, filed on Dec. 20, 2004.

(51) Int. Cl.
*B28B 3/00* (2006.01)

(52) U.S. Cl. .......................... 264/604; 264/676

(58) Field of Classification Search ................. 264/604, 264/676
See application file for complete search history.

(56) References Cited

U.S. PATENT DOCUMENTS

| | | |
|---|---|---|
| 2,027,786 A | 1/1936 | Ridgway et al. |
| 3,914,371 A | 10/1975 | Benton et al. ................. 264/332 |
| 4,005,235 A | 1/1977 | Prochazka |
| 4,104,062 A | 8/1978 | Weaver |
| 4,195,066 A | 3/1980 | Schwetz et al. |
| 4,495,123 A | 1/1985 | Hunold et al. |
| 4,524,138 A | 6/1985 | Schwetz et al. ................. 501/90 |
| 4,704,250 A | 11/1987 | Cline et al. |
| 4,804,525 A | 2/1989 | Rafaniello et al. |
| 4,879,165 A | 11/1989 | Smith |
| 4,946,808 A | 8/1990 | Wei et al. |
| 4,980,104 A | 12/1990 | Kawasaki |
| 5,010,043 A | 4/1991 | Ringwood |
| 5,089,197 A | 2/1992 | Butler et al. |
| 5,182,059 A | 1/1993 | Kawasaki et al. |
| 5,312,788 A | 5/1994 | Li et al. |
| 5,348,694 A | 9/1994 | Goldberger |
| 5,505,899 A * | 4/1996 | Sigl et al. ..................... 264/29.7 |
| 5,523,268 A | 6/1996 | Ukyo et al. |
| 5,543,370 A | 8/1996 | Sigl et al. |
| 5,545,687 A * | 8/1996 | Burns et al. ................... 264/625 |
| 5,720,910 A | 2/1998 | Vlajic et al. |
| 5,720,911 A | 2/1998 | Taylor et al. |
| 6,001,304 A | 12/1999 | Yoo et al. |
| 6,203,908 B1 | 3/2001 | Cohen |
| 6,258,741 B1 | 7/2001 | Kohsaka et al. ................ 501/87 |

(Continued)

FOREIGN PATENT DOCUMENTS

| | | |
|---|---|---|
| EP | 0239789 | * 7/1987 |
| EP | 0 239 789 | 10/1987 |

(Continued)

OTHER PUBLICATIONS

Lee, et al., Sintering of Boron Carbide Heat-Treated With Hydrogen; J. Am. Ceram. Soc.; 2002; 85 [8]; pp. 2131-2133.*

(Continued)

*Primary Examiner* — Joseph Del Sole
*Assistant Examiner* — Russell J Kemmerle, III
(74) *Attorney, Agent, or Firm* — Ostrolenk Faber LLP

(57) ABSTRACT

A method for pressureless sintering of $B_4C$ without sintering agents which reduces sintering time without sacrificing relative density, and avoids decomposition of $B_4C$ and loss of relative density.

25 Claims, 16 Drawing Sheets

U.S. PATENT DOCUMENTS

| | | | |
|---|---|---|---|
| 6,315,945 | B1 | 11/2001 | Macki et al. |
| 6,500,507 | B1 | 12/2002 | Fisher |
| 6,613,462 | B2 | 9/2003 | Macki et al. |
| 6,699,450 | B2 | 3/2004 | Dunn et al. |
| 6,807,891 | B2 | 10/2004 | Fisher .......................... 89/36.02 |
| 6,855,428 | B2 | 2/2005 | Lau et al. |
| 2002/0005085 | A1 | 1/2002 | Macki et al. ................... 75/241 |
| 2004/0065868 | A1 | 4/2004 | Aghajanian et al. .......... 252/500 |
| 2004/0083880 | A1 | 5/2004 | Cohen .......................... 89/36.02 |
| 2004/0208772 | A1 | 10/2004 | Eiberger et al. ................. 419/10 |

FOREIGN PATENT DOCUMENTS

| | | |
|---|---|---|
| GB | 2014193 | 1/1979 |
| JP | 59-162180 | 9/1984 |
| JP | 62-153166 | 7/1987 |
| JP | 62-207762 | 9/1987 |
| JP | 63-156068 | 6/1988 |
| JP | 8337475 | 12/1996 |
| JP | 10-106875 | 4/1998 |
| JP | 2000-154062 | 6/2000 |
| JP | 2001-122665 | 5/2001 |
| WO | WO 00/68165 | 11/2000 |
| WO | WO 2004/110685 A2 | 12/2004 |
| WO | WO 2005/123626 | 12/2005 |

OTHER PUBLICATIONS

Hardness and Fracture Toughness of Pressureless-Sintered Boron Carbide ($B_4C$)—Dec. 6, 2001, American Ceramic Society.
Pressureless Sintering and Related Reaction Phenomena of $Al_2O_3$-Doped $B_4C$—Lee, Kim—Journal of Materials Science 27 (1992).
Ceramic Processing Before Firing—Department of Materials Science and Engineering, University of Florida, Gainesville.
The Effect of Stoichiometry on Mechanical Properties of Boron Carbide—Nihara, Nakahira, Hirai—Research Institute for Iron, Steel and Other Metals, Tohoku University, Jan. 1984.
The Effect of the Sintering Atmosphere on the Densification of $B_4C$ Ceramics—Frage, Levin, Dariel—Journal of Solid State Chemistry.
Handbook of Refractory Carbides and Nitrides—Properties, Characteristics, Processing and Applications—Pierson—Noyes Publications.
Sintering of Boron and Boron Carbide—Kalandadze, Shalamberidze, Peikrishvili—Journal of Solid State Chemistry.
Composition Effects on the Microstructure and Mechanical Properties of Sintered Boron Carbide—Melo, Da Silva, Bressiani Materials Science Forum vols. 299-300—1999.
Improvements of the Microstructure and Erosion Resistance of Boron Carbide with Additives—Larsson, Axen, Hogmark—Journal of Materials Science 35—2000.
The Properties and Structure of the Boron Carbide Phase—Bouchacourt, Thevenot—Journal of the Less-Common Metals (1981).
Mechanical Properties of Hot-Pressed B-$B_4C$ Materials—Champagne, Angers—1978—Department of Mining and Metallurgy, Universite Laval, Quebec.
Sintering Theory and Practice—German, The Pennsylvania State University.
Low-Cost Processing of Dense and Complex Products—Karjerm Adlerborn, Karlsson- Ceram. Eng. Sci. Proc. 1993.
High Temperature Oxides—Part II—Oxides of Rare Earths, Titanium, Zirconium, Hafnium, Niobium and Tantalum—Alper—Sylvania Electric Products—1970.
Boron Carbide—A Comprehensive Review—Thevenot—Journal of the European Ceramic Society 1990.
Aqueous Dispersion and Slip Casting of Boron Carbide Powder; Effect of PH and Oxygen Content—Williams, Hawn—The Dow Chemical Company—1991.
Hot Isostatic Pressing—Larker—ABB Cerama AB, Sweden.
Density-and Hardness-Optimized Pressureless Sintered and Post-Hot Isostatic Pressed $B_4C$—Cho, Bao, Speyer—2005 Materials Research Society.
Nist-Janaf Thermochemical Tables—Fourth Edition Part 1, AL-CO—Chase—Journal of Physical and Chemical Reference Data—Monograph No. 9.
Structure and Single Phase Regime of Boron Carbides—Emin—The American Physical Society—1988.
Microstructural Coarsening During Sintering of Boron Carbide—Dole, Prochazka, Doremus—General Electric Company.
Mechanical Properties of Pressureless Sintered Boron Carbide Containing $TIB_2$ Phase—Skorokhod, Vlajic, Krstic—Journal of Materials Science Letters—1996.
H. Lee et al., "Sintering of Boron Carbide Heat-Treated with Hydrogen", *J. Am. Ceram. Soc.*, 85(8):2131-2133 (2002). (of record).
Champagne, et al.; Mechanical Properties of Hot-Pressed B-B4C Materials; 1977; 4 pages.
Pressureless Sintering of Boron Carbide—Lee & Speyer—School of Materials Science and Engineering, Georgia Institute of Technology, Atlanta, GA.
Characteristics and Properties of Silicon Carbide and Boron Carbide; Handbook of Refractory Carbides and Nitrides; pp. 137-155.
Frage, et al.; The effect of the sintering atmosphere on the densification of B4C ceramics; Journal of Solid State Chemistry; 2003; pp. 1-5.
Kalandadze, et al.; Sintering of Boron and Boron Carbide; Journal of Solid State Chemistry; 2000; 154; pp. 194-198.
Williams; Aqueous Dispersion and Slip Casting of Boron Carbide Powder: Effect of pH and Oxygen Content; J. Am. Ceram. Soc.; 1991; 74 [7]; pp. 1614-1618.
Edited by Onoda, Jr. And Hench; Ceramic Processing Before Firing; the Rheology of Organic Binder Solutions; pp. 249-251.
Nihara, et al.; The Effect of Stoichiometry on Mechanical Properties of Boron Carbide; Communications of the American Ceramic Society; Jan. 1984; pp. C-13-C14.
Francois Thevenot; Boron Carbide—A Comprehensive Review; Journal of the European Ceramic Society; 1990; 6; pp. 205-225.
de Melo, et al.; Composition Effects on the Micostructure and Mechanical Properties of Sintered Boron Carbide; Materials Science Forum; vols. 299-300; 1999; pp. 13-18.
Bouchacourt et al.; The Properties and Structure of the Boron Carbide Phase; Journal of the Less-Common Metals; 1981; vol. 82; pp. 227-235.
Larsson, et al.; Improvements of the microstructure and erosion resistance of boron carbide with additives; Journal of Materials Science; 2000; vol. 35; pp. 3433-3440.
International Search Report mailed Oct. 30, 2006 for PCT/US05/46116.

* cited by examiner ly sintered to as high as 96.7% RD.
DENSITY AND HARDNESS PRESSURELESS SINTERED AND POST-HIPED B$_4$C

RELATED APPLICATION

This application is based on, claims benefit of, and incorporates by reference the disclosure of U.S. Provisional Application Ser. No. 60/638,077, filed on Dec. 20, 2004, entitled DENSITY AND HARDNESS-OPTIMIZED PRESSURELESS SINTERED AND POST-HIPED B$_4$C, and U.S. Provisional Application Ser. No. 60/647,471, filed on Jan. 27, 2005, entitled DENSITY AND HARDNESS OPTIMIZATION OF PRESSURELESS SINTERED AND POST HIPED B$_4$C.

DEFINITIONS

As set forth hereafter the term "dope" and all its grammatical manifestations refer to adding sintering agents to the boron carbide powder mix for the purpose of enhancing pressureless sintering; the term "undope" and all its grammatical manifestations refer to excluding sintering agents from the powder mix to avoid the adverse effects resulting from the addition of sintering agents; the abbreviation "HP" and all its grammatical manifestations refer to hot pressing; the abbreviation "HIP" (or "post-HIP") and the grammatical manifestations thereof refer to hot isostatic pressing; the abbreviation "CIP" and all its grammatical manifestations refer to cold isostatic pressing.

BACKGROUND OF THE INVENTION

Boron carbide (also referred to here as B$_4$C) is the third hardest material next to diamond and cubic boron nitride. Combined with its low theoretical density (2.52 g/cm$^3$), B$_4$C is the premier material for personal armor-typically in the form of front and back flat plates which are bonded to a polymer backing and used as ballistic inserts in flack jackets. B$_4$C is also used for nuclear shielding applications because of boron's high neutron absorption cross-section. In addition, B$_4$C is used in particulate form as an abrasive, and as a nozzle material for slurry pumping and grit blasting because of its excellent abrasion resistance.

Effective ballistic armor materials must have very high hardness combined with high fracture toughness. When a high-velocity projectile makes contact with the surface of a ballistic material such as B$_4$C, a compressive shock wave extends hemispherically from the point of contact, generating tensile, tangential stresses which cause radial cracks that emanate from the point of contact. These tangential stresses tear open cracks, preferentially at the site of pores and fissures. Therefore, ballistic performance of B$_4$C improves with decreasing porosity, i.e. with increasing fired relative density.

Achieving near-theoretical density has required gang-hot pressing (stacked parts under pressure). Hot pressing does not allow for the cost effective fabrication of complex shapes. For example, the fabrication of form-fitting body armor parts would require machining after the hot pressing process, which is expensive and technically difficult.

Complex shapes (including form-fitting parts) are possible with pressureless sintering. According to the prior art, additives such as carbon, SiC, Al$_2$O$_3$, TiB$_2$, AlF$_3$ and W$_2$B$_5$ have been used as sintering agents in pressureless sintering to increase the sintered density. However, second phases due to the agents often have deleterious effects on the mechanical behavior of B$_4$C.

The best known sintering agent for B$_4$C is carbon. According to one prior art method, phenolic resin is used as a source of carbon. The carbon from the phenolic resin is distributed around the B$_4$C particles, and also serves as a pressing agent. Relative densities up to 98% have been obtained using carbon as a sintering agent. Carbon, when used as a sintering agent in pressureless sintering, however, promotes undesirable secondary phases and materials such as graphite which adversely affect the mechanical properties of the B$_4$C.

Pressureless sintering of B$_4$C without sintering agents has been difficult. Schwetz et al. in U.S. Pat. No. 4,195,066 cites to studies in which B$_4$C has been pressureless sintered at near melting temperatures. However, the resulting material suffered in one study from low relative densities, and in the other study from poor mechanical properties compared to materials produced by hot pressing. In addition, Schwetz et al. noted that because the process required reaching close to the melting temperature of B$_4$C it impaired the dimensional stability of the specimens.

In U.S. patent application Ser. No. 10/867,442 (assigned to the assignee of the present application) it is disclosed that limited densification pressureless sintering without sintering agents may be due to the presence of B$_2$O$_3$ coatings on B$_4$C particles. It is further disclosed that the vaporization of B$_2$O$_3$ coatings permits direct B$_4$C-B$_4$C contact, and a corresponding surge in densification between 1870 and 2010° C. The loss of B$_2$O$_3$ coatings was implied by weight loss measurements.

Briefly, according to the disclosure of Ser. No. 10/867,442, to remove B$_2$O$_3$ coatings, B$_4$C green body specimens are heated at a temperature between 1100° C.-1400° C. in a furnace and in the presence of a flowing He—H$_2$ gas mixture. Prior to pressureless sintering, hydrogen is fully purged from the furnace chamber before continued heating. Otherwise, it is believed, hydrogen residing in interstitial locations within B$_4$C particles facilitates increased evaporation/condensation coarsening of B$_4$C, and consequently lower final densities. To purge hydrogen, the specimens can be soaked in He or held in vacuum for a period of time prior to pressureless sintering.

Specifically, the following method is taught in Ser. No. 10/867,442. After driving B$_2$O$_3$ out, the specimens are heated in the presence of He at a heating rate in the range 50 to 150° C./minute to a soaking temperature selected from the range 2300 to 2400° C., and held at the soaking temperature until the shrinkage rate is about 0.005%/minute. Using this method, specimens were pressureless sintered to as high as 96.7% RD.

In addition, Ser. No. 10/867,442 teaches that pressureless-sintered specimens can be further densified through hot isostatic pressing. The components so densified reached RD values above 99% when pressed under 310 MPa of gas pressure.

Through further study, it has been found that over the temperature range 1870-1950° C., particle coarsening occurred due to evaporation and condensation (from small to large particles) of rapidly evolving oxide gases (e.g. BO and CO), weight loss and particle/grain coarsening, stalled between 1960 and 2010° C., and resumed thereafter, concurrent with slowed densification up to about 2140° C. The resumption of weight loss and particle/grain coarsening, corresponds to evaporation and condensation of B$_4$C (or its molecular fragments), a coarsening mechanism typical of such covalently-bonded solids. Above 2140° C. accelerated sintering occurred, which was projected to be caused by non-stoichiometric volatilization of B$_4$C that left carbon behind. The carbon is believed to accelerate sintering through enhanced grain boundary diffusivity, i.e. activated sintering, and inhibiting grain growth to keep diffusion distances relatively short.

It was further found that rapid heating through the range 1870-1950° C. left less time for oxide-facilitated particle coarsening to take place (if oxide had not previously been removed by a lower temperature $H_2$/He treatment), and through the range 2010-2140° C., minimized the time over which coarsening could occur by evaporation and condensation of $B_4C$. Rapid heating brought comparatively small, high surface energy particles into an elevated temperature range, over which (activated) sintering was rapid relative to coarsening. Thus, rapid heating was found to be preferred to avoid particle coarsening.

SUMMARY OF THE INVENTION

Through further study it has been found that adverse effects on the mechanical properties of $B_4C$ can be avoided if certain critical parameters are observed. Specifically, the following critical parameters were found:
1. Pressureless sintering in the temperature range of 2200°-2300° C. results in the highest relative densities, i.e. as high as 96.7%. Below that range, sintering was incomplete, above that range excessive carbon formation occurred above 2317° C. and decomposition of $B_4C$ occurred above 2336° C.
2. The soaking temperatures yielded high relative densities only as a result of monitoring the densification behavior, and cooling after sintering shrinkage had reached near zero shrinkage rate (i.e. shrinkage rate of 0.005%/min).
3. Soaking times decreased with increasing soaking temperature.
4. Soaking beyond the near zero shrinkage resulted in abnormal grain growth, pore coarsening, and an increase in the overall porosity (i.e. decreased relative density).
5. Post-HIPing brought pressureless sintered $B_4C$ all the way to theoretical density, and the pressures required were actually quite low, i.e. 69 MPa to less than 310 MPa, which allows for a lower manufacturing cost.

A method of preparing a boron carbide article according to the present invention, therefore, includes forming a boron carbide compact from undoped boron carbide particles coated by boron oxide, forming a boron carbide green body from the boron carbide compact, driving the boron oxide out of the boron carbide body to obtain a reduced boron carbide green body, and pressureless sintering the reduced boron carbide body at a pressureless soaking temperature that does not exceed 2336° C. to obtain a pressureless sintered boron carbide body. By pressureless sintering at a temperature below 2336° C. the decomposition of $B_4C$ can be avoided.

According to one aspect of the present invention, the pressureless sintering is continued until the sintered boron carbide body reaches a relative density of at least 93% (i.e. closed porosity), whereby the sintered body is ready for further densification through post-HIPing.

According to another aspect of the present invention, the pressureless soaking temperature does not exceed 2317° C. to avoid graphite formation.

The pressureless sintered $B_4C$ bodies can be post-HIPed for further densification. It has been found that pressureless sintered bodies formed according to the present invention can be post-HIPed using a gas pressure below 310 MPa to a relative density that is higher than 99%.

In addition, it has been found that about 10% $H_2$ during $B_2O_3$ removal is high enough to remove the $B_2O_3$, but low enough to minimize the hydrogen interstitials. In an alternative embodiment, vacuum can be used to remove $B_2O_3$.

Other features and advantages of the present invention will become apparent from the following description of the invention which refers to the accompanying drawings.

DETAILED DESCRIPTION OF THE INVENTION

Figure 1A:
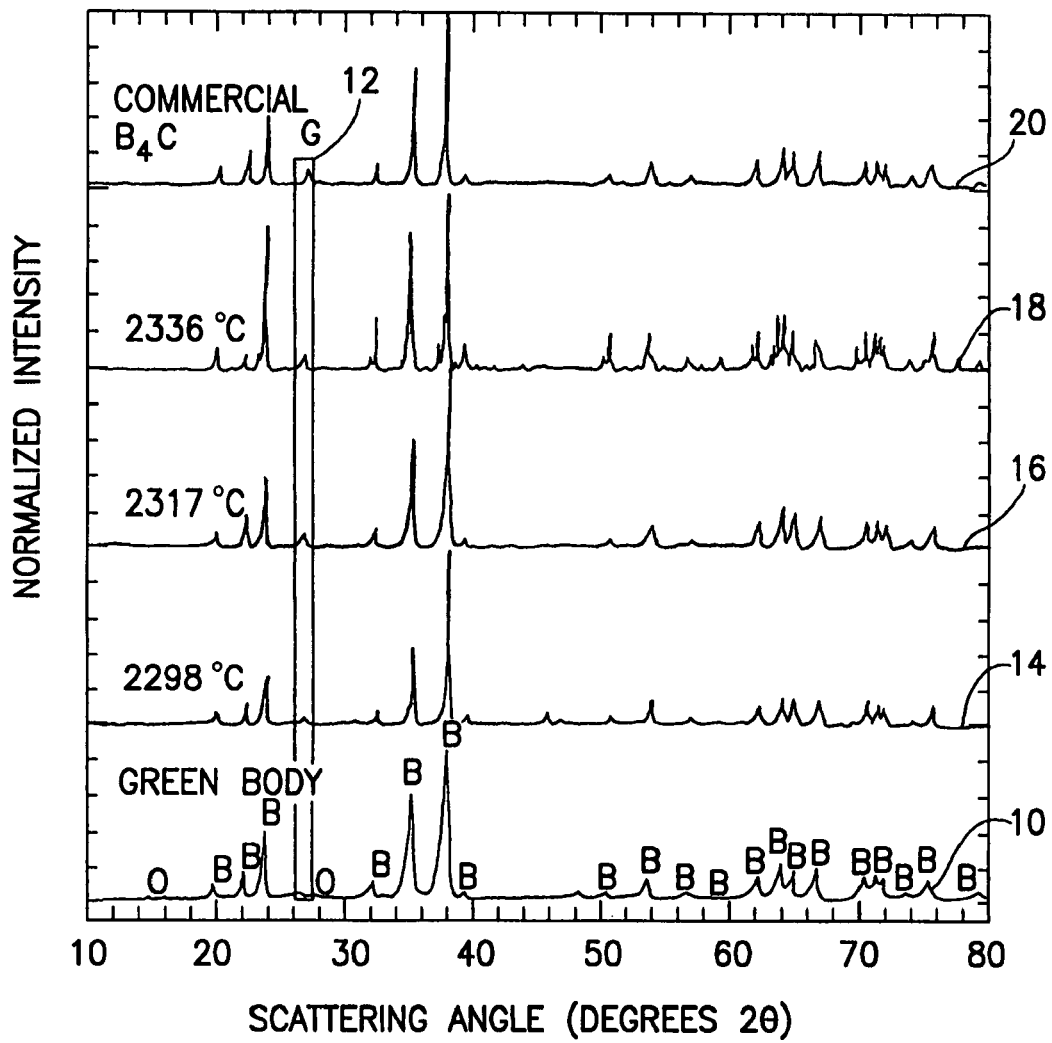
FIG. 1A shows the XRD patterns of a selection of specimens prepared according to the present invention and a commercial prior art process.
Figure 1B:
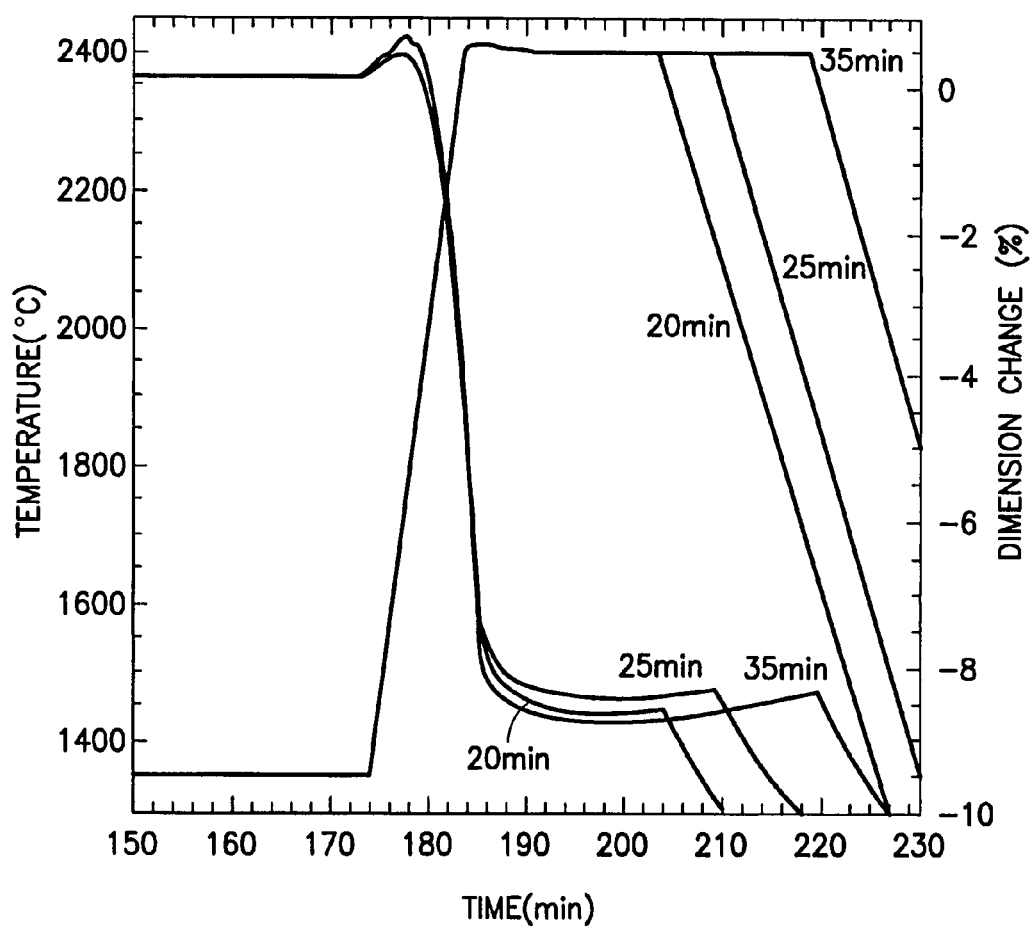
FIG. 1B graphically shows dilatometry curves and temperature profiles of specimens soaked for various times at 2298° C. The 0.005%/minute shrinkage rate was met at 17.5 minutes. After that time, expansion is apparent from the dilatometry curves corresponding to decreases in relative density.

According to the present invention, a method for forming a boron carbide article through pressureless sintering without doping includes forming a boron carbide compact from boron carbide particles coated by boron oxide; forming a boron carbide green body from the boron carbide compact; driving the boron oxide out of the boron carbide green body to obtain a reduced boron carbide green body; and pressureless sintering the reduced boron carbide body at a pressureless sintering temperature that does not exceed 2336° C. to obtain a pressureless sintered boron carbide body. The soaking temperature is kept below 2336° C. in order to avoid the decomposition of boron carbide, which can have adverse effects on the mechanical properties of the boron carbide article.

According to the present invention no sintering agent is used to dope the boron carbide powder that is used to form the boron carbide compact. However, there is no specific restriction on the method of forming the boron carbide green body. That is, the boron carbide body can be formed using any known method including slip casting, CIPing, or the like. The data obtained through further study, however, suggests that the relative density of the green body may have an effect on the relative density of sintered boron carbide body. Specifically, the data suggests that relative density of about 64% or higher can result in a pressureless sintered density of 93% or higher.

The method for removing the boron oxide in the present invention is essentially the same as that set forth in Ser. No. 10/867,442. Briefly, the method includes heating the green body to a temperature between 1100° C. and 1400° C. in the presence of hydrogen, e.g. a gas mixture of $H_2$ and He, in order to drive the boron oxide out and obtain a reduced boron carbide body. Thereafter, the reduced boron carbide body is maintained at the same temperature in the presence of either flowing He or in vacuum in order to drive out any H residing interstitially in the reduced boron carbide body. The time required for driving out the boron oxide and for driving out the residual H can vary. Ser. No. 10/867,442 calls for 30-120 minutes for driving out the boron oxide and 120-480 minutes for driving out the residual hydrogen. These time values may change depending on the size of the boron carbide green body. It is noteworthy that vacuum is as effective as $H_2$ for removing $B_2O_3$. The $H_2$ reacts with $B_2O_3$ to form gases which are then removed. Vacuum removes the vapor that is produced by $B_2O_3$, which results in further vaporization of $B_2O_3$ until it has all been removed.

After the H is driven out, the reduced and purged boron carbide body is heated to the soaking temperature and is held at that temperature in the presence of He until the shrinkage rate of the sintered boron carbide body reaches about 0.005%/minute. Thereafter, the boron carbide body is cooled.

A pressureless sintered boron carbide body according to the present invention can be further densified through post-HIPing to enhance its ballistic capabilities. To post-HIP a boron carbide body it is believed that a relative density of 93% or more is required. It has been found that a pressureless sintered boron carbide body that is formed according to the present invention can be post-HIPed to over 99% relative density using pressures below 310 MPa to as low as 69 MPa.

In another embodiment of the present invention the pressureless soaking temperature does not exceed 2317° C. in order to prevent graphite formation which can also have negative effects on the mechanical properties of the boron carbide article.

It has been found that the optimum soaking temperature range for high relative density and high hardness combination is 2136-2298° C. Thus, according to the preferred embodiment of the present invention the pressureless soaking temperature is selected from the range 2136-2298° C.

The studies reported below illustrate the criticality of the parameters selected for a method according to the present invention.

Study I: Soaking Temperature and Time for Pressureless Sintering, and the Effect of PostHIPing Compared to Commercial HPing.

TABLE 1

| $B_4C$ powder characteristics | |
|---|---|
| Surface Area | 18.8 m²/g |
| Particle size | 90% of particles ≦2.99 μm |
| | 50% of particles ≦0.84 μm |
| | 10% of particles ≦0.24 μm |
| Impurity levels | 1.50 wt % O |
| | 0.41 wt % N |
| | 0.022 wt % Fe |
| | 0.055 wt % Si |
| | 0.003 wt % Al |
| | 0.23 wt % Other |
| Total boron | 75.39 wt % |
| Total carbon | 22.26 wt % |
| B/C molar ratio | 3.76 |

To prepare the specimens, commercially available $B_4C$ powders (Grade HS, H. C. Starck, Berlin, Germany) were used in the as-received state. Table 1 shows the characteristics of the powder based on the manufacturer's data. Two powder stocks of grade HS were used, one coded '00 (indicating powder lot year 2000), and the other coded '03 (indicating year 2003). Undoped powder compacts of $B_4C$ powder (i.e. with no sintering agents) were prepared by placing loose powder in die and punch assemblies of one of three sizes. The powder compacts were uniaxially pressed under 250-300 MPa (Model No. 3925, Carver Inc., Wabash, Ind.) to form cylindrical green body pellets of 6.41 mm diameter and approximately 5 mm in height, or 15.01 mm diameter and approximately 3 mm in height. To form larger green bodies, powder compacts of 44.45 mm diameter and approximately 13.5 mm height were uniaxially pressed (Model V-50-1818-2TMX, Series 8323, Wabash Metal Products Inc., Wabash Ind.) at increasing pressures of 100, 200 and 300 MPa, holding at each pressure for 5 minutes.

Powder compacts were also prepared using CIP. Specimens for CIP were initially shaped using the steel dies and punches under 10 MPa of uniaxial pressure. To form green bodies, CIPing of specimens encased in latex was then performed at either approximately 200 MPa (Model CIP32260, Flow Autoclave Systems, Columbus, Ohio) or 413 MPa (model CP360, American Isostatic Presses, Inc., Columbus, Ohio). For the latter pressure, increasing pressure to maximum occurred over approximately 10 minutes. Maximum pressure was then applied for approximately 1 minute and pressure release followed over approximately 2-3 minutes.

The densification process of smaller samples was monitored by a differential dilatometer. The procedure for using a differential dilatometer is disclosed in H. Lee and R. F. Speyer "Pressureless Sintering of Boron Carbide," J. Am. Ceram. Soc. 86[9] 1468-1473 (2003); and H. Lee, W. S. Hackenberger, and R. F. Speyer, "Sintering of Boron Carbide Heat-Treated with Hydrogen," J. Am. Ceram. Soc. 85[8] 2131-2133 (2002), the entire disclosure of which is incorporated by reference. The infrared pyrometer used in the dilatometer was calibrated using the allotropic transformations of a pressed compact of high-purity iron (99.99-%, Sigma-Aldrich, St. Louis, Mo.). The iron pellet was placed between alumina spacers in contact with the graphite pushrod and casing. Zirconia powder was uniaxially pressed into the shape of a cylindrical pellet and pre-sintered in a $MoSi_2$ box furnace in stagnant air at 1500° C. for five hours. This sintered specimen was then used as another calibration standard in the graphite dilatometer.

A first group of green bodies prepared from the '00 stock of $B_4C$ powder was heated at a heating rate of 50° C./minute to 1300° C. and sintered in a flowing 50-50 vol % $H_2$—He mixture for 30 minutes to drive out the $B_2O_3$, and then heated at that temperature for two hours under flowing He to drive out the hydrogen and obtain reduced $B_4C$ bodies. The reduced bodies so obtained were then heated at 100° C./min to various temperatures in the range 2136-2336° C., and soaked at those temperatures in the presence of He until the contraction rate was less than 0.005%/minute, after which time the $B_4C$ sintered specimens were cooled to room temperature at 50° C./minute. For the 44.45 mm diameter specimens, the same furnace and similar temperature/atmosphere schedules were used with the dilatometer assembly removed.

To prepare a second group of $B_4C$ sintered specimens, green bodies from the '03 $B_4C$ powder stock were subjected to the same heat treatment schedule as the first group but were soaked at 2298° C. for various fixed time periods up to 150 minutes.

After pressureless sintering, some pressureless sintered specimens were post-HIPed (American Isostatic Presses, Inc., Columbus, Ohio) by heating at a rate of 20° C./minute to 2150° C., soaking for 125 minutes, and cooling at 20° C./minute, all under 310 MPa of argon pressure. More specifically, the specimens were HIPed under argon pressure in the range of about 69-310 MPa.

The sintered specimens mounted in plastic (for the purposes of grinding) (Ultramount, Buehler, Lake Bluff, Ill.) were successively ground using 45, 15, 9 µm diamond grinding discs (Metal-bonded diamond grinding discs, Buehler, Lake Bluff, Ill. and DP-Diamond Spray M, Struers, Westlake, Ohio) with water. The grind times and rotating speeds were about 10 minutes and 150 rpm, respectively. The specimens were then polished with 6, 3, 1 µm diamond suspension (Metadi Supreme, Buehler, Lake Bluff, Ill. and DP-Diamond Spray M, Struers, Westlake, Ohio) on soft cloths (Texmet 1000, Buehler, Lake Bluff, Ill.). The polishing times and speeds were 30-60 minutes at 200 rpm respectively. Specimens were rinsed with water after each step. The polished specimens were then removed from their plastic encasement. Indentation hardness of the polished specimens was measured using a Vickers indenter (MHT Series 200, LECO, St. Joseph, Mich.) following the ASTM International, West Conshohocken, Pa., C1327-99 standard test method for advanced ceramics. Specimens were indented with a 9.81 N load for 15 seconds at multiple locations until ten acceptable (as specified in the standard test method) indents were obtained. A commercially manufactured (uniaxially) hot-pressed specimen of dimensions 1 cm×1 cm×1.53 mm in thickness was similarly polished and evaluated. Calibration of the indenter system was performed using WC-based NIST, Gaithersburg, Md., standard reference material (SRM No. 2831). Based on five indentations, the measured hardness was 1559±10 kb/mm², which was within 1.5% of the certified value of 1535 kg/mm².

The ground and polished specimens were then electrolytically etched for 1 minute in a solution of 1% KOH, using 0.03 A/cm², applied using a current source meter (Model 2400, Keithley, Taunton, Mass.). The microstructures of etched specimens were characterized using scanning electron microscopy (SEM; Model S800, Hitachi, San Diego, Calif., and Model 1530 SEM, LEO Electron Microscopy, Inc., Oberkochen, Germany). Average grain size and grain size distribution were determined using the linear intercept method, each based on 700 measurements on micrographs scanning electron microscope (SEM). Magnification was calibrated using a 300 mesh (84.67 µm line spacing) nickel calibration grid (Structure Probe, Inc., West Chester, Pa.).

Specimen densities were measured using Archimedes method. Percent relative densities were based on a theoretical $B_4C$ density of 2.52 g/cm³. X-ray diffraction (XRD) data (PW 1800 powder X-ray diffractometer, Philips, Mahwah, N.J.) was collected from 10 to 80° C. with a scan speed of 1 second/step and a step size of 0.005°. Diffraction patterns of as-fired specimens were taken after the surface layer was ground away.

Results

FIG. 1A shows XRD patterns of a selection of specimens soaked until shrinkage rate was less than 0.005%, and XRD patterns of unfired powder compact and a commercial hot-pressed $B_4C$ specimen. The diffraction pattern intensities were normalized so that the intensities of the most intense peaks in each pattern were made equal. B: $B_4C$ solid solution (ICDD: 37-0798), O: $B_2O_3$ (ICDD: 13-0570); G: carbon (graphite, ICDD: 75-2078). Referring to FIG. 1A, crystalline $B_2O_3$ was detected in the XRD pattern 10 of the green body. Based on the peak 12 at 26.6° C. 2θ, corresponding to the most intense peak of graphite, some free carbon was present in the as-received powder, and its relative proportion remained roughly constant after heat-treatments up to 2298° C. as indicated by XRD pattern 14 at peak 12. At soaking temperatures of 2317° C. and above, the greater intensity of peak 12 in XRD patterns 16, 18 (which is similar to peak 12 of XRD pattern 20 of a commercial HP $B_4C$ specimen) implies an increase in graphite content. Peak splitting is apparent for the specimen heat-treated at 2336° C.

Figure 2:
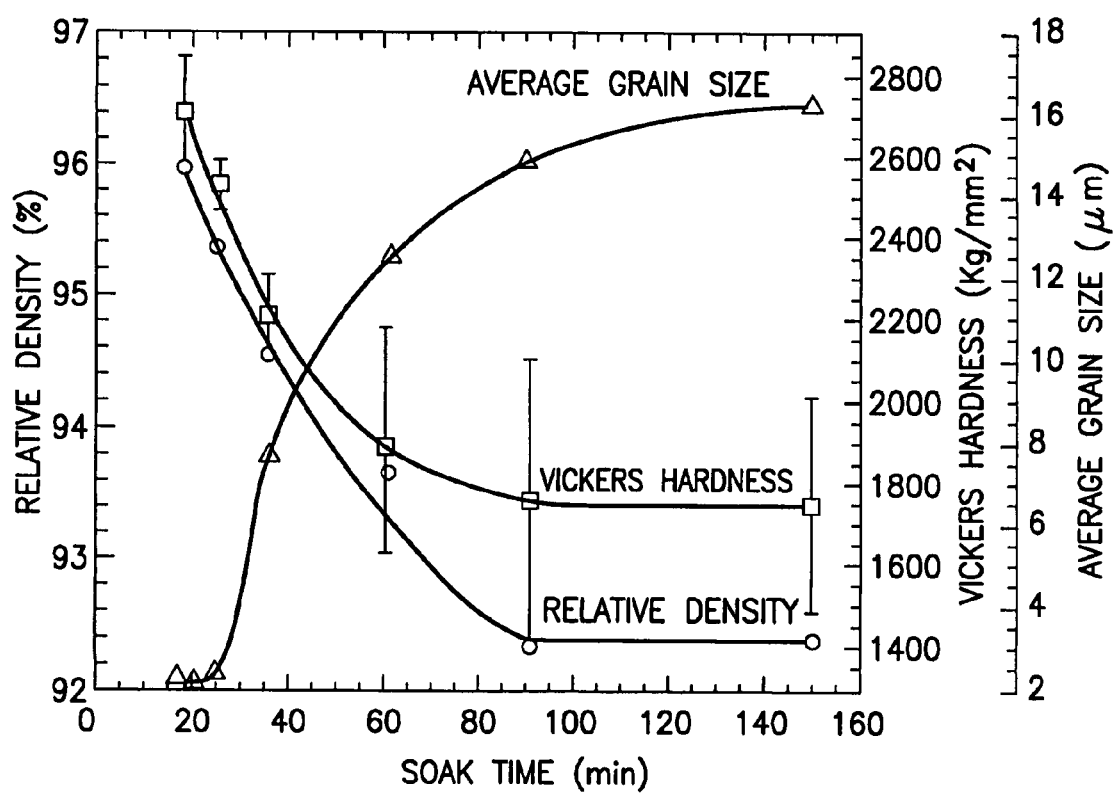
FIG. 2 graphically illustrates that the Vickers hardness and the relative density of specimens decrease with increasing soak time at 2298° C. while the average grain size dramatically increases.

FIG. 2 shows that the relative density and Vickers hardness both decreased, while the average grain size increased with increasing soaking time at 2298° C. Note that error bars represent standard deviations calculated from ten acceptable hardness measurements.

Figure 3A:
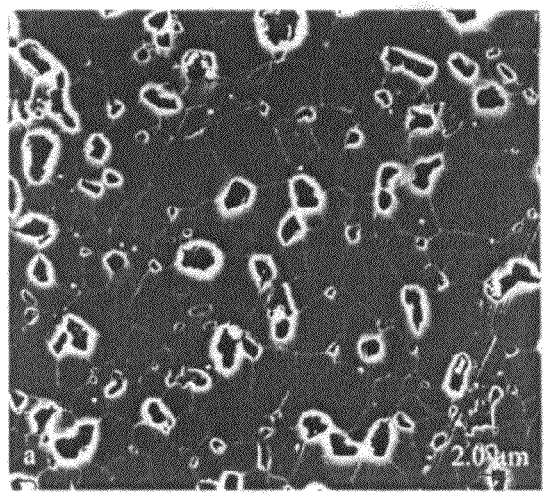
FIGS. 3A-3C show micrographs of specimens soaked at 2298° C. for 17.5 minutes, 35 minutes, and 150 minutes respectively (in FIG. 3B the grain boundaries were drawn-over to facilitate visual clarity).
Figure 3B:
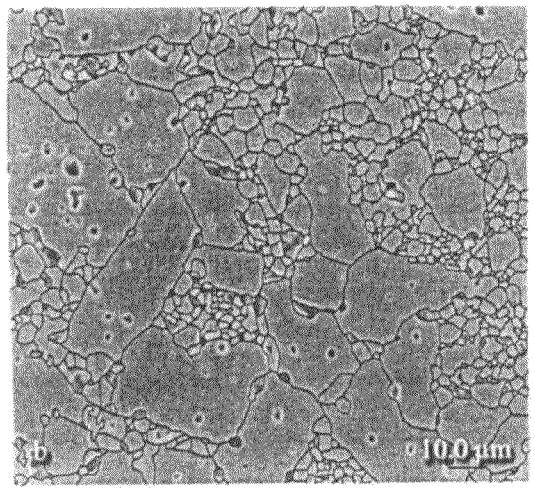
Figure 3C:
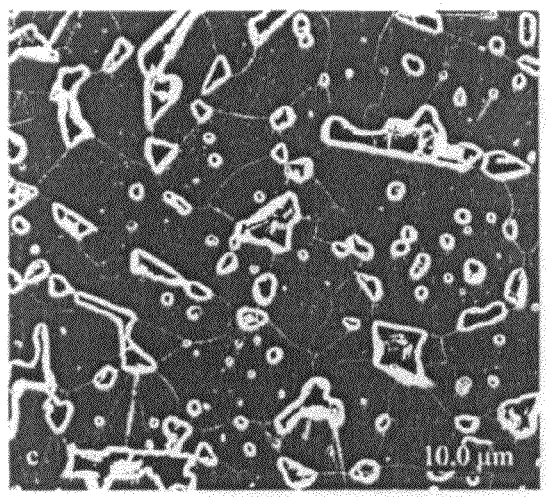

After soaking for 17.5 minutes (time required to reach a shrinkage rate of 0.005%/min), no porosity was apparent within the grains, as seen in FIG. 3A. Both polishing grain pull-outs as well as pores are depicted in FIG. 3A. As shown in FIG. 3B, after 35 minutes of soaking, grain growth was far from uniform throughout the microstructure. After soaking for 150 minutes, pores were observed within grains, and comparatively large fissures had formed at the grain boundaries, as seen in FIG. 3C. Dilatometry traces showed a gradual specimen expansion during the soaking period (e.g., the specimen soaked for 35 minutes showed a linear expansion of 0.38% over that time, FIG. 10B). No change in 2θ positions, the relative concentration of graphite, nor the formation of any other phases, were detected, however.

Figure 4A:
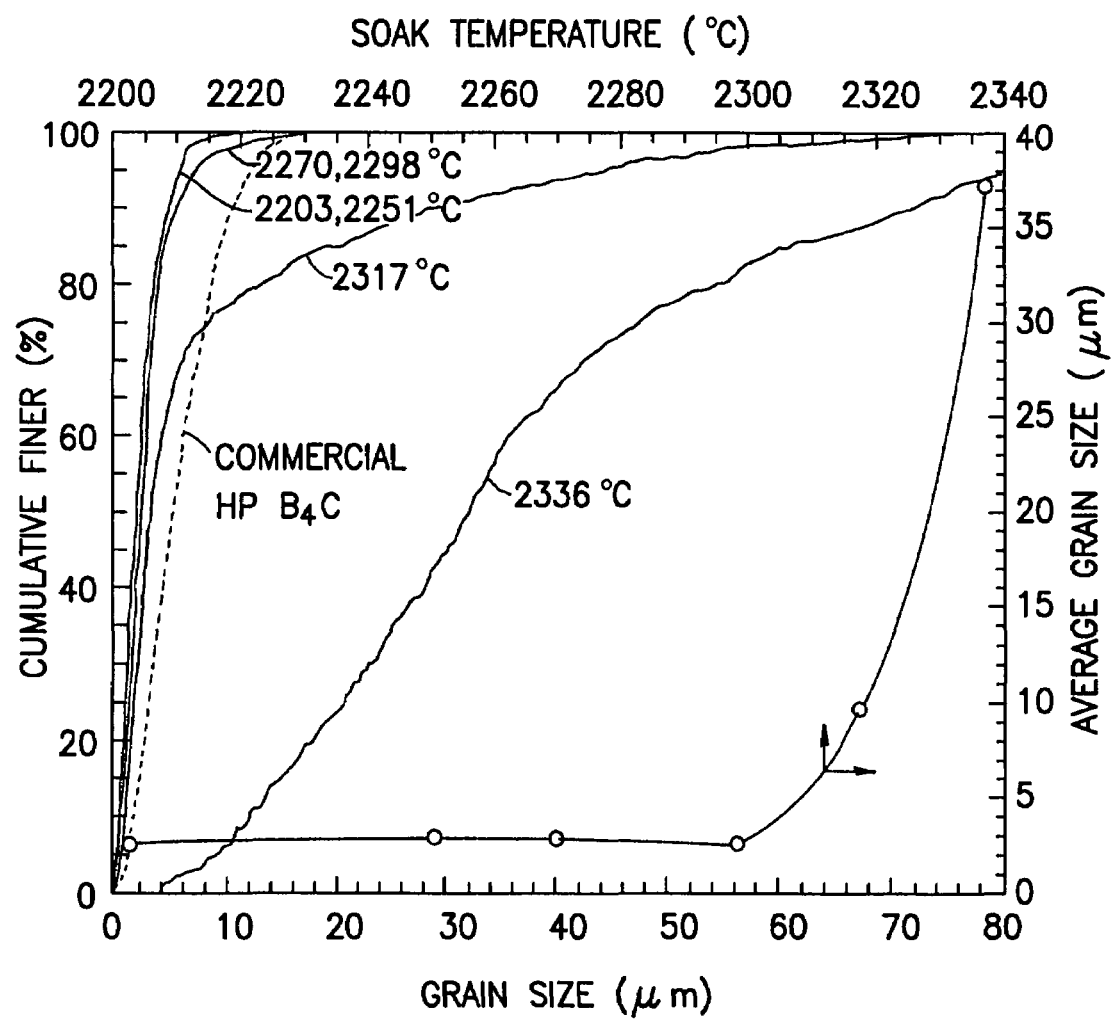
FIG. 4A shows the effect of raising the soaking temperature (using the 0.005%/minute shrinkage rate criterion for soaking time) on the grain size distribution using the linear intercept method. Abnormal grain growth is indicated above 2300° C. The grain size distribution of a commercial HP material is plotted for comparison. Average grain sizes as a function of soaking temperature are also shown.

FIG. 4A shows the change in average grain size and grain size distribution with increasing soaking temperature. The soaking times at each of these temperatures were those required to reach a shrinkage rate of 0.005%/minute (i.e., the termination of soaking), and these times decreased with increasing soaking temperature. Substantial grain growth was detected above 2298° C. A bimodal grain size distribution is apparent for the specimen soaked at 2317° C., whereas the grains appear uniformly large after soaking at 2336° C. (FIG. 4A), with substantial porosity embedded within the grains. Therefore, to avoid abnormal grain growth, pressureless soaking below 2300° C. leads to optimum results.

Figure 4B:
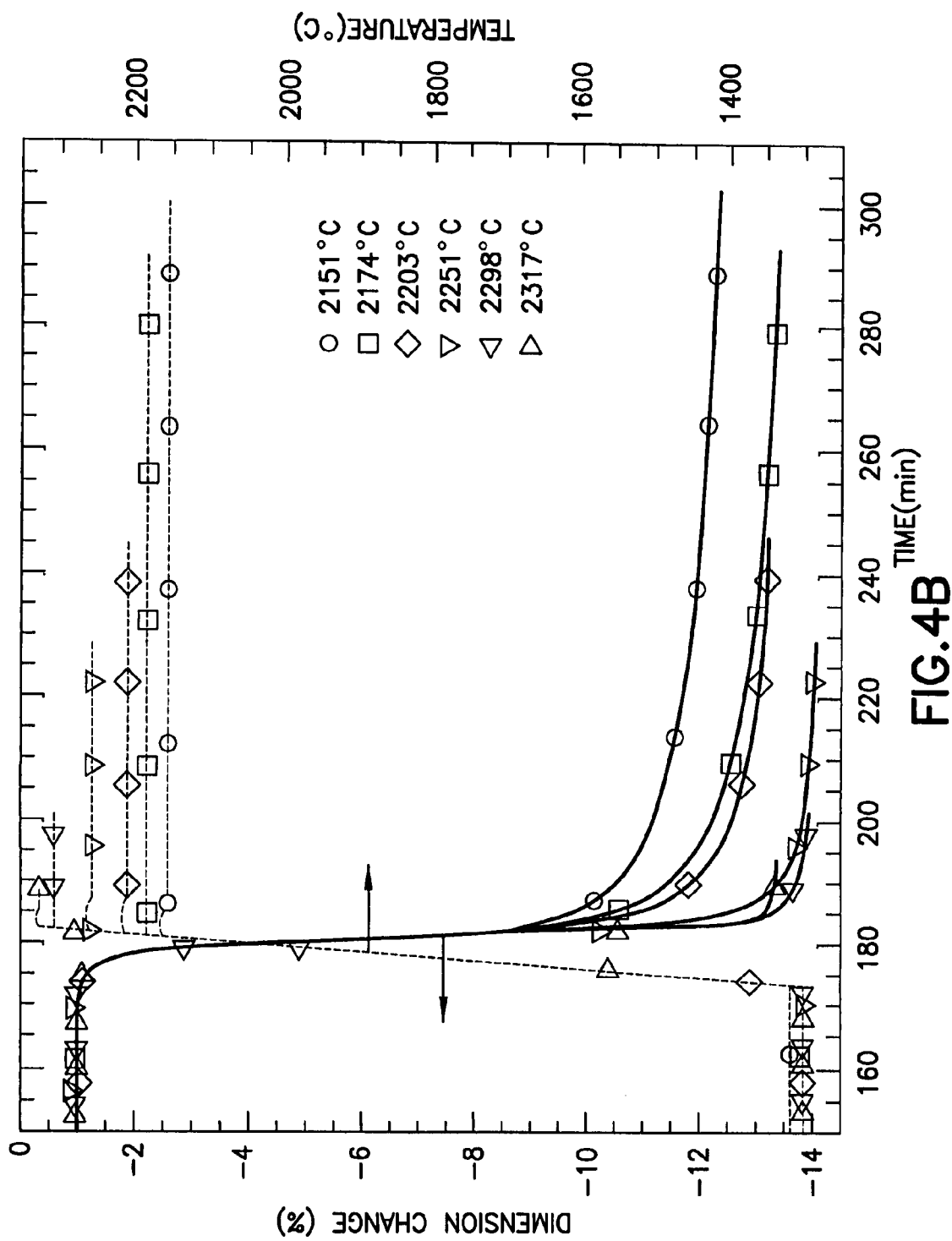
FIG. 4B shows sintering curves and temperature profiles for specimens sintered in a dilatometer, soaked at different temperatures until the shrinkage rate reached 0.005%/minute.

FIG. 4B shows that the time required to reach maximum densification (sintering contraction) decreases with increasing soaking temperature. The extent of densification increases with increasing soaking temperature up to 2298° C.

Dilatometry results then show a decrease in extent in densification at 2317° C. The following can be used to determine the proper soaking time and temperature: soak time=0.6622 (soak temperature)—1417.7, in which soaking time is in minutes and soaking temperature is in degrees C.

Figure 5A:
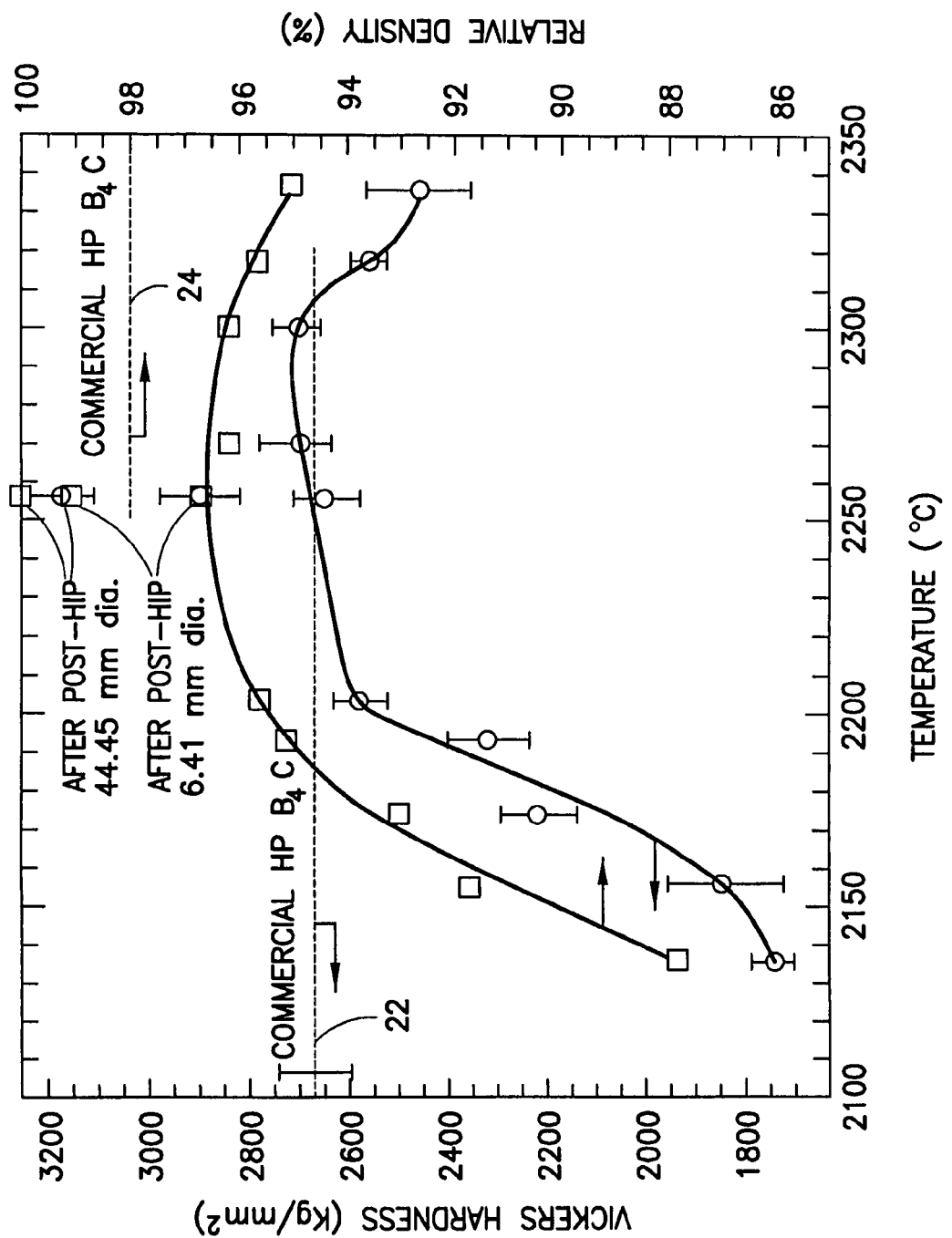
FIG. 5A graphically illustrates the effect of soaking temperature on Vickers hardness and relative density as well as the Vickers hardness and relative density values for post-HIPed specimens and a commercial hot-pressed $B_4C$ specimen.

FIG. 5A shows that the relative density increased with increasing soaking temperature up to about 2251° C., with maximum values over the range 2251-2298° C., and decreased after exposure to higher temperatures (the specimens were soaked until the shrinkage rate reached 0.005%/minute). The maximum relative density values (e.g., 96.7% for the specimen soaked at 2251° C.) were markedly higher than those achieved in our previous studies. Vickers hardness values followed the trends of relative density though average values were slightly increasing with increasing temperature over the range 2203-2298° C. These results indicate that pressureless soaking below about 2300° C. leads to optimum combination of relative density and grain size.

FIG. 5A graphically shows relative densities and Vickers hardnesses measured for 6.41 mm diameter specimens which were pressureless sintered at various soaking temperatures until the shrinkage rate was less than 0.005%/minute. It should be noted that error bars represent standard deviations calculated from ten acceptable hardness measurements. The relative density and Vickers hardness for a post-HIPed specimen and a commercial hot-pressed $B_4C$ specimen are also shown for camparison.

Figure 5B:
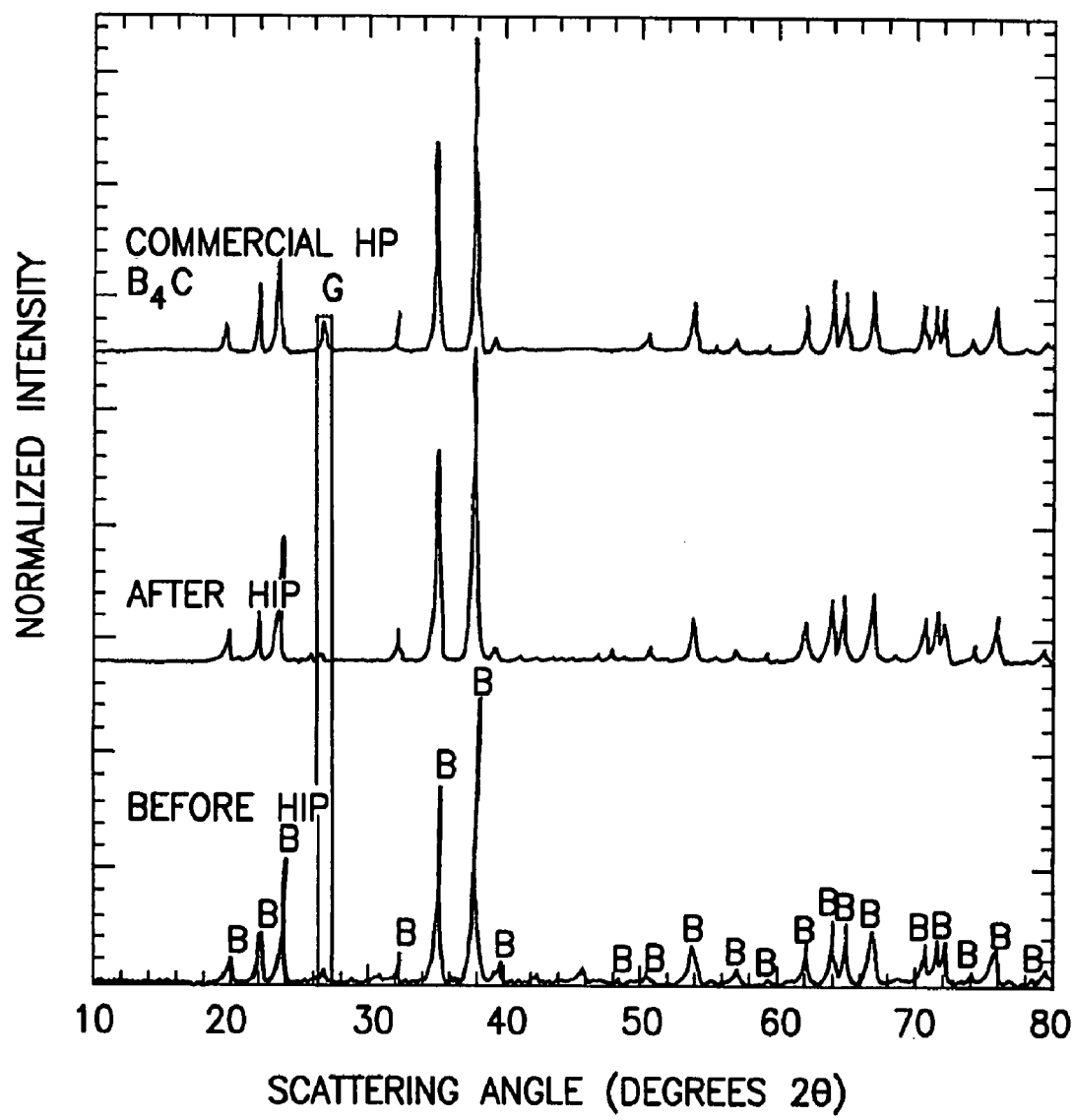
FIG. 5B shows XRD patterns for a pressureless sintered specimen, a post-HIPed specimen, and a commercially HPed specimen.
Figure 6:
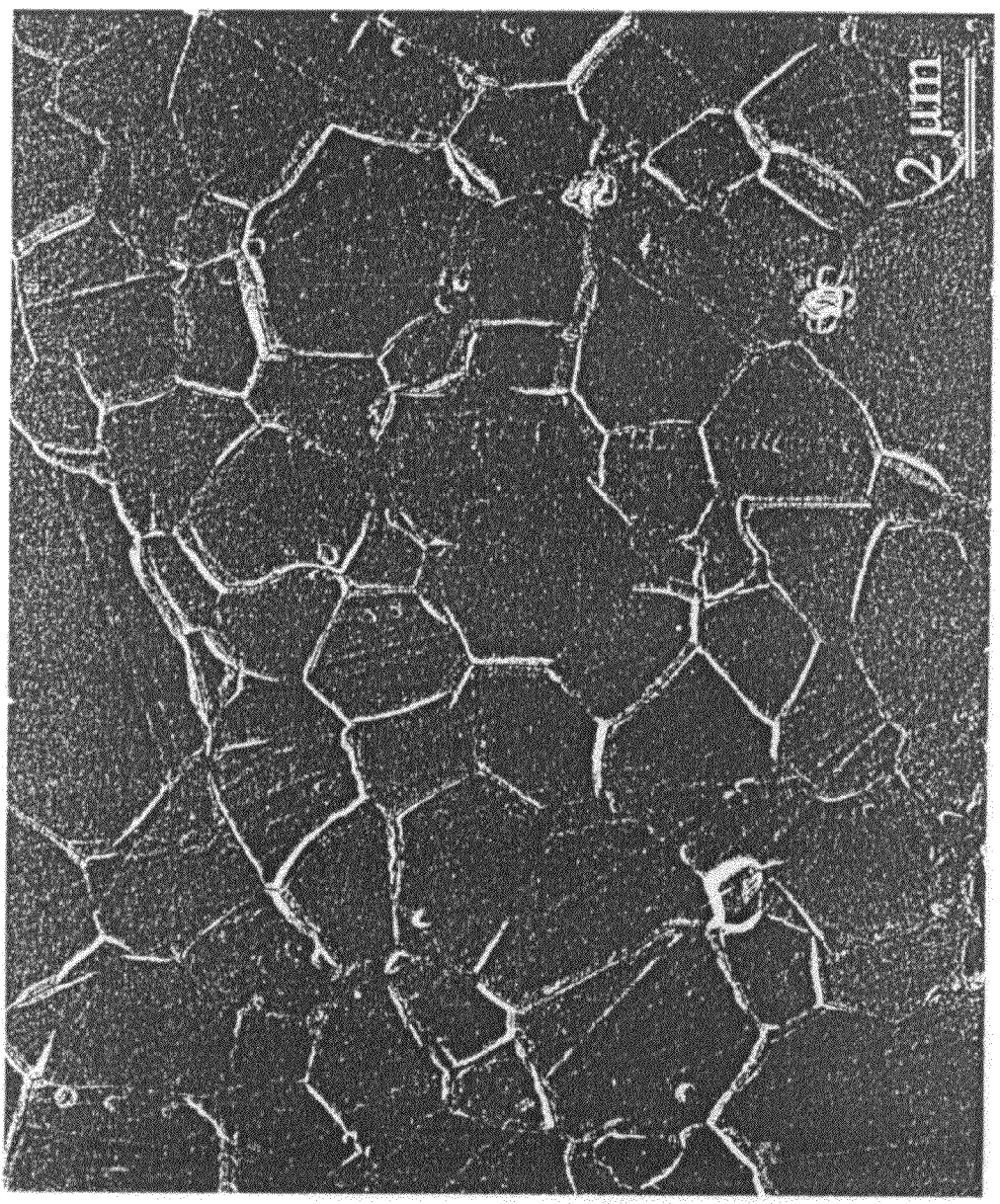
FIG. 6 shows a micrograph of a pressureless sintered and post-HIPed specimen according to the present invention.

Note that after post-HIPing the pressureless-sintered specimens, the relative density and hardness values were significantly enhanced. The 44.45 mm diameter specimen from the second group (the '03 group) shown in FIG. 5A, post-HIPed to full theoretical density and showed a remarkably high hardness. As seen in FIG. 5B, the XRD patterns did not indicate changes in 2θ positions or relative intensities as a result of post-HIPing, which indicates that no new phase change occurred due to post HIPing. A typical microstructure of a post-HIPed specimen is shown in FIG. 6.

The relative density 24 of the commercial HPed $B_4C$ specimen was greater than the relative densities of pressureless sintered $B_4C$ (FIG. 5A). The Vickers hardness values, however, were the same as the pressureless sintered specimens soaked in the range 2270-2298° C. Both the relative density 24 and Vickers hardness 22 of commercial HPed $B_4C$ were lower than those measured for pressureless sintered and post-HIPed $B_4C$.

Referring to FIG. 4A, the commercial HPed $B_4C$ specimens had slightly larger grain size and broader grain size distribution compared to pressureless sintered $B_4C$ specimens. The intensity of the most intense XRD graphite peak was comparatively larger for the commercial HPed $B_4C$ specimen than for pressureless sintered or pressureless sintered followed by post-HIPed samples (compare the 2298° C. and the commercial $B_4C$ XRD trace in FIG. 1A).

Figure 7:
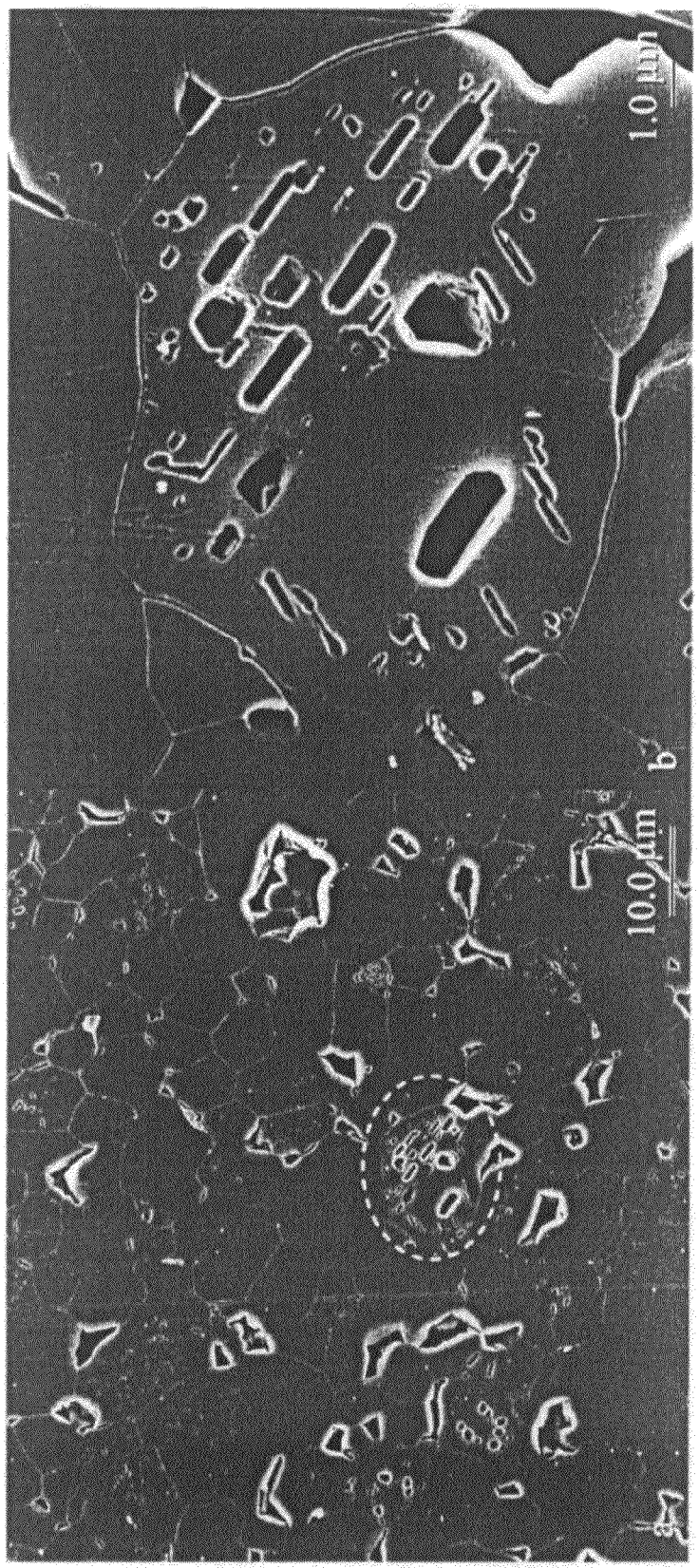
FIG. 7 shows a micrograph of a commercially HPed specimen on the left, and on the right a magnified view of the circled region in the micrograph shown on the left hand side.

A typical microstructure of the commercial HPed $B_4C$ specimen is shown in FIG. 7. As seen in FIG. 7, unique, non-spherical pores, whose facets appear mutually oriented, appear within some grains, but not others. FIG. 3A shows a pressureless sintered $B_4C$ specimen and FIG. 6 shows the microstructure of a pressureless sintered and post-HIPed $B_4C$ specimen (HIPed at 2150° C., for one hour, under 45,000 psi). In FIG. 3A, both polishing grain pull-outs and pores were observed. On the other hand, the microstructure of the HIPed specimen shows a well sintered microstructure with no pores and few pull-outs.

Table II enumerates pressing methods and resulting green body, pressureless sintered, and post-HIPed relative densities for specimens of differing sizes. The analytical balance used for Archimedes density measurements displayed a variation over time of ±0.01 mg. Based on propagation of random error, relative density errors of ±0.14%, 0.04%, 0.00%, and 0.09% are expected for the 6.41, 15.01, 44.45 mm diameter, and commercial HPed samples, respectively. Small (6.41 mm diameter) samples either cold uniaxially or isostatically pressed to high green relative density (68-70%), displayed pressureless-sintered relative densities of 96.2-96.7%, and post-HIPed to relative densities of 99.0-99.1%. Uniaxially pressed large samples were pressureless sintered to higher relative density (e.g., 95.3 and 95.7%) than those CIPed at 200 MPa; however, these samples showed radial cracking. The large (44.45 mm diameter) CIPed samples were pressureless sintered to a slightly lower relative density than the small (6.41 mm diameter) CIPed or uniaxially pressed samples. Near-theoretical relative densities (>99.5%) were obtained for the large samples that were CIPed and pressureless sintered, when their relative densities were 93.0% or higher prior to post-HIPing. CIPing large specimens at the higher pressure of 413 MPa resulted in higher green relative densities (70%). This combined with a higher soaking temperature and a shorter soaking time yielded pressureless sintered relative densities of 95.3%, which were then post-HIPed completely to theoretical density (specimens 12-15 in Table II). The same result was obtained with post-HIPing gas pressures as low as 69 MPa.

TABLE II

Pressing and Heat-Treatment Parameters of Samples of Different Sizes and Their Resulting Relative Densities

| No. | Lot year | Green body dia. (mm) | Uniaxial pressure (MPa) | CIP pressure (MPa) | Green relative density (%) | Soaking Temperature (° C.) | Soak time (min) | Fired relative density (%) | Post-HIP sinter temp. (° C.) | Post-HIP pressure (MPa) | Post-HIP relative density (%) |
|---|---|---|---|---|---|---|---|---|---|---|---|
| 1 | '00 | 6.41 | 300 | — | 68 | 2251 | 60 | 96.2 | 2150 | 310 | 99.1 |
| 2 | '00 | 6.41 | 300 | — | 68 | 2251 | 45 | 96.7 | 2150 | 310 | 99.0 |
| 3 | '00 | 6.41 | 10 | 413 | 70 | 2251 | 45 | 96.2 | 2150 | 310 | — |
| 4 | '00 | 15.01 | 300 | — | 68 | 2251 | 60 | 96.0 | 2150 | 310 | 99.7 |
| 5 | '00 | 44.45 | 10 | 200 | 64 | 2251 | 60 | 93.0 | 2150 | 310 | 99.8 |
| 6 | '00 | 44.45 | 10 | 200 | 64 | 2222 | 60 | 92.4 | 2150 | 310 | 97.1 |
| 7 | '00 | 44.45 | 10 | 200 | 64 | 2222 | 60 | 93.2 | 2150 | 310 | 99.7 |
| 8 | '00 | 44.45 | 10 | 200 | 64 | 2222 | 60 | 93.1 | 2150 | 310 | 99.7 |
| 9 | '00 | 44.45 | 10 | 200 | 64 | 2222 | 60 | 91.3 | 2150 | 310 | 93.3 |
| 10 | '00 | 44.45 | 250 | — | 68 | 2222 | 45 | 95.7 | 2150 | 310 | 99.5 |
| 11 | '00 | 44.45 | 250 | — | 68 | 2222 | 60 | 95.3 | 2150 | 310 | — |
| 12 | '03 | 44.45 | 10 | 413 | 70 | 2251 | 40 | 95.3 | 2150 | 207 | 100.0 |
| 13 | '03 | 44.45 | 10 | 413 | 70 | 2251 | 40 | 95.3 | 2000 | 207 | 100.0 |
| 14 | '03 | 44.45 | 10 | 413 | 70 | 2251 | 40 | 95.2 | 2150 | 138 | 100.0 |
| 15 | '03 | 44.45 | 10 | 413 | 71 | 2251 | 40 | 95.3 | 2150 | 69 | 100.0 |

Discussion

In the results disclosed herein, the presence of $B_2O_3$ was confirmed directly from the XRD pattern of the green compacts (FIG. 1A).

The results show that soaking at 2298° C. for times longer than the minimum required (i.e. shrinkage rates less than 0.005%/minute) to reach the termination of densification precipitously degraded the relative density and Vickers hardness (FIG. 2). The degradation can be associated with exaggerated grain growth. For example, the grain size after 150 minutes of soak time was an order of magnitude larger than that after 17.5 minutes. The large grains were the cause of the apparent preferred orientation effects in the XRD patterns (variations in relative intensities). It is believed that as the grains grew, the original grain boundary porosity was likely dragged, accumulated, and discarded to form the large fissures decorating the slow-growth directions of the boundaries of the large grains as seen in FIG. 3C. The decrease in relative density implies some dilation of these pores/fissures, which is perhaps attributable to the pressure of trapped He or $B_4C$ (or its molecular subunits) vapor, or strains to accommodate exaggerated grain growth. The decrease in hardness is believed to be attributable to the increased grain size, which decreases the grain boundary area available for dislocation pinning, as well as the increased porosity. The increased scattering in hardness values with longer soak times is consistent with the coarser microstructure showing less uniformly distributed porosity, which imposes more variability from indent to indent.

The results show that Vickers hardness increased in concert with relative density as the soaking temperature was increased up to 2251° C., as expected. Soaking temperatures at and above 2317° C. showed a degradation in relative density and Vickers hardness, concurrent with rapid grain growth, and increase in graphite concentration. At or above 2336° C. soaking temperature some form of decomposition of the $B_4C$ phase was observed. The increase in graphite content is consistent with the proposition that $B_4C$, especially at more elevated temperatures, forms a boron rich vapor, leaving carbon behind at the grain boundaries or triple points. It is also possible; however, that the elevated temperatures permitted pre-existing amorphous carbon to devitrify to graphite. Exaggerated grain growth at the higher soaking temperatures occurred (e.g., the bimodal grain size distribution of the specimen soaked at 2317° C. in FIG. 4) which is a similar result obtained due to long soak periods at 2298° C. However, unlike the results obtained due to long soak periods at 2298° C., extensive porosity was left within the large grains, and large fissures at the boundaries were not evident. It is believed that higher temperatures enabled grain boundaries to more easily pull away from pores.

The faceted pores observed only in the commercial (uniaxially) HPed $B_4C$ (FIG. 7) have been coined "negative crystals" since facets are aligned with specific crystallographic planes of the grain. It is speculated that grains suffering from these negative crystals were originally particles that were wedged into poor fit with their neighbors prior to uniaxial hot pressing. The extensive deformation of these particles, partly resulting from plastic flow and partly from sintering diffusion to conform with neighboring particles, required extensive shear deformation, which was accommodated by formation of these internal cavities.

Advantageously, the results show that although the density of commercial hot-pressed $B_4C$ was higher than densities obtained by pressureless sintering, the Vickers hardness values (for soaking temperatures in the range 2203-2317° C.) were the same within experimental error (FIG. 5A). Higher graphite concentration (FIG. 1A), slightly higher average grain size (FIG. 4A), and well-dispersed fine porosity (negative crystals) of the commercial hot-pressed specimen, may all have contributed to the lowering of the Vickers hardness of the commercial HPed $B_4C$ to the range of the pressureless sintered specimens, which had a comparatively higher concentration of porosity.

As seen in Table II, sintered densities were higher with higher green densities. For the larger specimens, CIPing was required to achieve uniformity in particle packing in the green state, to in turn form crack-free sintered parts. Post-HIPing of pressureless sintered specimens was remarkably beneficial to relative density and hardness for specimens that had been pressureless sintered to closed porosity (>93% relative density). The absence of pull-outs in micrographs of post-HIPed specimens (e.g., FIG. 6) may imply that pull-outs in other micrographs (e.g., FIG. 3A) are associated with grains with adjacent grain boundary porosity. The XRD patterns indicated that post-HIPing did not change the nature of the $B_4C$ phase. In addition, the relative density and Vickers hardnesses were markedly higher than those of commercial hot-pressed $B_4C$. Moreover, unlike hot-pressing, using the pressureless sintering method disclosed herein, a part may be cast (e.g., slip cast) into a complex shape, pressureless sintered, and post-HIPed with that shape retained.

The XRD pattern (FIG. 1A) for the 2336° C. sintered specimen shows the beginnings of splitting a number of diffraction peaks. This may be the result of a transformation of the rhombohedral crystal structure to one of lower symmetry, or the beginnings of the decomposition of the original structure into distinct regions of differing lattice parameters, resulting from different solid solution B/C ratios. Soaking the specimens for a period no longer than that required to reach near-zero densification rate (i.e. shrinkage rate less 0.005%/minute) was beneficial at maintaining the maximum values of relative density and hardness (FIG. 2).

Based on the most intense graphite peak in FIG. 1A, the relative proportion of graphite in the pressureless sintered specimen increased relative to that in the green body for soaking temperatures at and above 2317° C. This lends support to the argument that at adequately elevated temperatures, $B_4C$ volatilizes non-stoichiometrically to leave residual carbon at grain/particle boundaries. It is also possible, however, that these temperatures permitted amorphous carbon to devitrify to graphite. The additional graphite in the specimens soaked at 2317° C. and 2336° C. correlates to diminished hardness (FIG. 3).

Referring to Table II, only the uniaxially pressed larger-sized (44.45 mm diameter) specimens pressureless sintered to densities in the range achieved by the small (6.41 mm dia.) specimens. This result implies that the intimacy of particle contact in the direction of minimum specimen thickness, i.e. minimum thermal resistance, is an important factor. The very rapid heating rates used in the densification schedule may not be realized in the interiors of specimens in which the thermal conductivity in the direction of minimum surface-to-center distance is not high.

More details regarding this study can be found in Cho et al., Density and Hardness-Optimized Pressureless Sintered and Post-Hot Isostatic Pressed $B_4C$, J. Mater. Res., Vol. 20, No. 8, August 2005, the entire disclosure of which is incorporated by reference.

Study II—Comparison of Undoped Pressureless Sintering and Doped Pressureless Sintering In another study, undoped specimens (specimens without sintering agents) were prepared according to the pressureless sintering process of the present invention, and for comparison purposes, doped specimens were prepared using carbon as a sintering agent. Specifically, a phenolic resin dissolved in acetone was mixed with $B_4C$ powder, yielding about 40% by weight of finely divided carbon. The phenolic resin solution contributed about 3% of carbon, based on the total weight of the $B_4C$. The $B_4C$ powder used had the same characteristics as that set forth in Table I.

The undoped and the doped powder mixtures were then uniaxially pressed under about 200 MPa of pressure into green body cylinders of about 5 mm in height and 6.4 mm in diameter.

The undoped green bodies were then heated in the presence of argon, and also in the presence of helium. It was observed that $B_4C$ lost weight while heating in argon to 380° C. This weight was not regained during cooling argon or exposure to flowing, dry air after cooling. During heating in helium, the green bodies lost weight, but then regained sometimes more weight upon exposure to moist room temperature air. These results clearly indicate that green compacts absorb atmospheric moisture. This behavior halted at about 1600°-1900° C., corresponding to the approach of the boiling temperature of $B_2O_3$. The weight gain upon exposure to air is attributed to moisture absorption due to the highly hygroscopic nature of $B_2O_3$ (likely coverting to orthoboric acid $H_3BO_3$). Over the temperature span of 1600°-1900° C., no weight loss was observed, which was followed by a weight loss above 2000° C. by a different mechanism, namely the volatilization of $B_4C$ itself. It was determined that 2.4% weight loss indicated an average $B_2O_3$ coating thickness of about 4.0 nm.

Figure 8A:
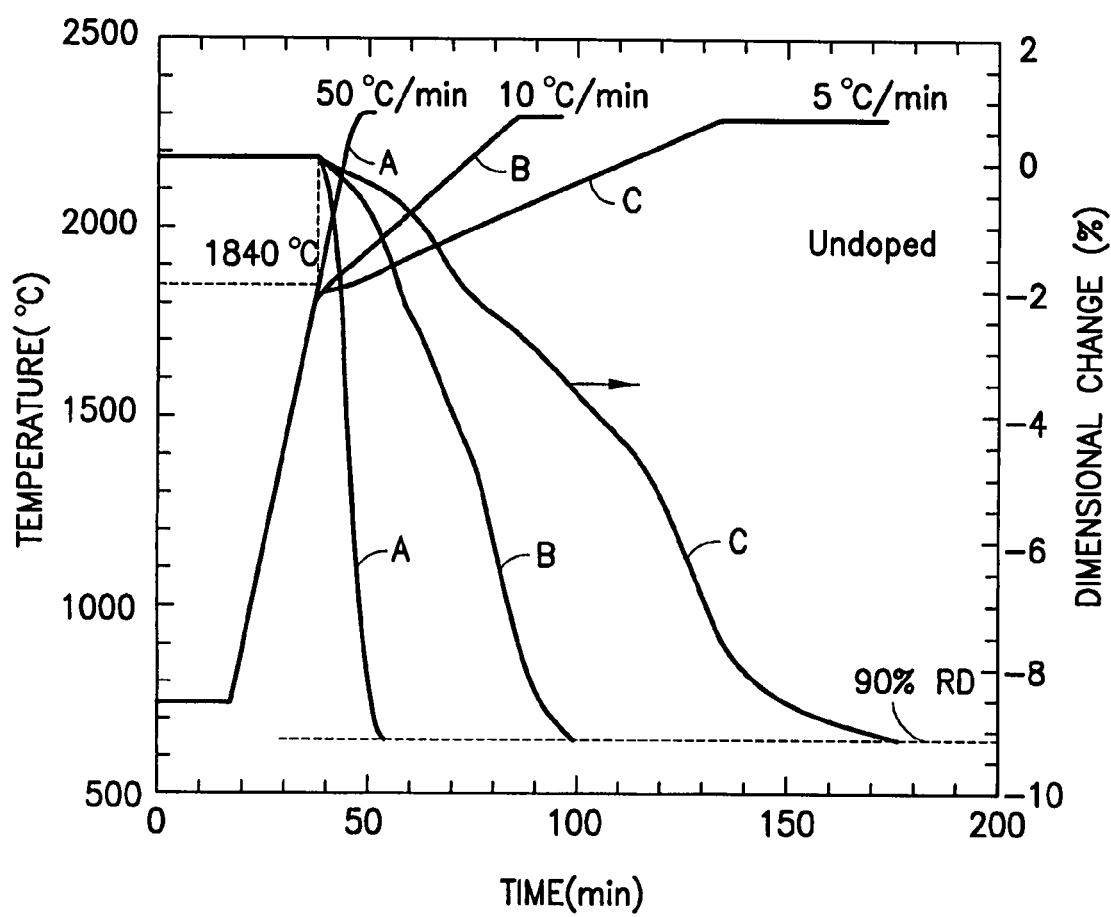
FIG. 8A shows that for undoped $B_4C$, with the criterion of reaching 90% relative density, the time at the soaking temperature increases with decreasing heating rate to the soaking temperature.
Figure 8B:
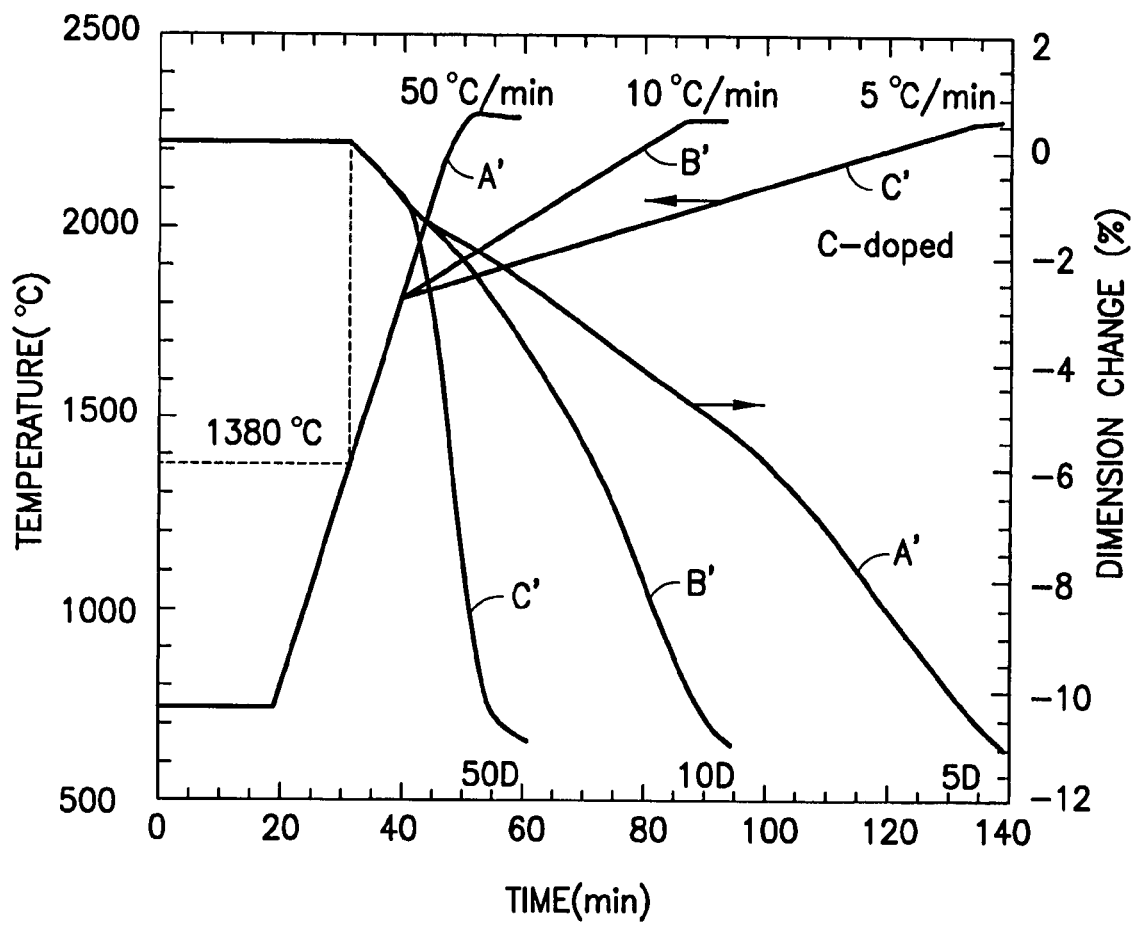
FIG. 8B shows that for carbon-doped $B_4C$, with the criterion of reaching 97% relative density, the time at the soaking temperature decreases with decreasing heating rate to the soaking temperature.

The doped green bodies were heated to 2280° C. at 50° C./minute (Specimen A'), 10° C./minute (Specimen B'), and 5° C./minute (Specimen C'). Thereafter, the doped specimens were soaked at that temperature until 97% relative density was reached. Referring to FIG. 8B, as expected, specimens exposed to slower heating required shorter soaking periods to reach 97% relative density. FIG. 8B also shows that the doped specimens all began to sinter around 1380° C., which is about 460° C. lower than the soaking temperature for the undoped specimens.

The undoped green compacts were heated to 2280° C. at 50° C./minute (Specimen A), 10° C./minute (Specimen B), and 5° C./minute (Specimen C). Thereafter, the undoped specimens were sintered to 90% relative density. Referring to FIG. 8A, it was surprisingly determined that the specimen that was exposed to a slower heating rate required a longer soaking time in order to reach 90% relative density. Also, FIG. 8A shows that the undoped specimens all began to sinter around 1840° C. In comparing FIGS. 8A and 8B, it is interpreted that the lower sintering onset temperature for the case of carbon doping was a result of the carbon reacting with the boron oxide coatings and removing them as CO and $B_2O_2$ vapors. This permitted direct $B_4C$ to $B_4C$ contact and a reduced onset of sintering. The phenomena observed in FIG. 8A is explained by particle coarsening which was observed to a much greater extent in the undoped compacts as compared to those which were doped. Heating slowly facilitated substantial coarsening due to the presence of $B_2O_3$ (the mechanism may be solution and precipitation through the liquid oxide coatings, or an oxide vapor transport mechanism). This in turn required longer soak times to bring the coarsened (lower sintering energy) particles to a specific relative density. In the doped specimens with the oxide layer stripped away, coarsening was not dominant and slower heating rates permitted a greater extent of sintering in advance of the soak temperature, in turn requiring a shorter soaking period in order to reach a fixed density.

Specimens were heated at different rates to 2250° C. and soaked until the shrinkage rate was less than 0.005%/minute to determine the effect of heating rate on maximum relative density. The results are shown in Table III.

TABLE III

| | Undoped samples | | Doped samples | |
|---|---|---|---|---|
| Heating rate (° C./min) | Density (% of TD) | Grain Size (μm) | Density (% of TD) | Grain size (μm) |
| 10 | 91.33 ± 0.42 | 2.86 ± 0.03 | 98.56 ± 0.50 | 2.35 ± 0.02 |
| 30 | 92.31 ± 0.52 | 2.81 ± 0.04 | 98.65 ± 0.48 | 2.34 ± 0.06 |
| 100 | 92.76 ± 0.27 | 2.77 ± 0.04 | 98.47 ± 0.30 | 2.31 ± 0.03 |

TABLE IV

| Atmosphere | Soaking Temperature (° C.) | Soaking Time (min) | Final Density (% of TD) |
|---|---|---|---|
| He only | no sintering | 0 | 90.7 ± 0.4 |
| $H_2$(5%) + He(95%) | no sintering | 0 | 90.7 ± 0.4 |
| $H_2$ only | no sintering | 0 | 90.5 ± 0.6 |
| He only | 1000 | 30 | 90.8 ± 0.5 |
| $H_2$(5%) + He(95%) | 1000 | 30 | 90.9 ± 0.4 |
| $H_2$(10%) + H(90%) | 1000 | 30 | 90.7 ± 0.4 |
| He only | 1350 | 30 | 91.6 ± 0.3 |
| He only | 1350 | 180 | 91.5 ± 0.3 |
| $H_2$(5%) + He(95%) | 1350 | 30 | 93.1 ± 0.4 |
| $H_2$(5%) + He(95%) | 1350 | 180 | 93.7 ± 0.3 |
| $H_2$(5%) + He(95%) | 1350 | 540 | 93.6 |
| $H_2$(10%) + He(90%) | 1350 | 30 | 93.8 ± 0.4 |
| $H_2$(20%) + He(80%) | 1350 | 30 | 93.2 ± 0.4 |
| $H_2$(30%) + He(70%) | 1350 | 30 | 92.8 ± 0.4 |
| $H_2$(40%) + He(60%) | 1350 | 30 | 92.3 ± 0.3 |
| $H_2$(50%) + He(50%) | 1350 | 30 | 89.6 ± 0.5 |
| $H_2$ only | 1350 | 30 | 90.4 ± 0.3 |
| $H_2$ only | 1350 | 180 | 90.2 |
| He only | 1600 | 30 | 91.0 ± 0.3 |
| $H_2$(5%) + He(95%) | 1600 | 30 | 91.7 ± 0.6 |
| $H_{10}$(5%) + He(90%) | 1600 | 30 | 92.3 ± 0.3 |
| $H_{10}$(5%) + He(90%) | 1750 | 30 | 91.0 |
| $H_2$(5%) + He(95%) | 1900 | 30 | 90.1 ± 0.4 |
| $H_2$(10%) + He(90%) | 1900 | 30 | 89.5 ± 0.3 |

TABLE V

| Atmosphere to 1350° C., He after | Soaking time at 1350° C. (min) | Heating rate, 1350 to 2230° C. (° C./min) | Soaking time at 2230° C. (min) | Final density (% of TD) |
|---|---|---|---|---|
| $H_2$(10%) + He(90%) | 30 | 100 | 30 | 94.0 |
| $H_2$(10%) + He(90%) | 30 | 100 | until 0% shrinkage | 94.3 |
| $H_2$(50%) + He(50%) | 30 | 100 | until 0% shrinkage | 94.1 |
| $H_2$(50%) + He(50%) | 30, 100% He for 120 | 100 | until 0% shrinkage | 94.7 |

TABLE VI

| Vacuum to 1350° C., He after | Soaking time at 1350° C. (min) | Heating rate, 1350 to 2230° C. (° C./min) | Soaking time at 2230° C. (min) | Final density (% of TD) |
|---|---|---|---|---|
| Mech. pump constant | 120 | 100 | until 0% shrinkage | 91.8 |
| Pump intermittent 5-50 kPa | 120 | 100 | until 0% shrinkage | 97.2 |

The density measurements were made by the Archimedes method. As seen in Table III, for undoped specimens, faster heating rates resulted in higher maximum densities and smaller grain sizes. However, the doped specimens did not show any measurable difference in grain size and relative density due to heating rate.

A further study was carried out to determine the effect of various $H_2$/He isothermal treatment temperatures and gas ratios on the relative density of undoped specimens. After this treatment, pure He was flowed through the furnace and samples were heated at 30° C./min up to 2230° C. and soaked for 30 min relative density of undoped specimens. The results are reported in Table IV. As seen in Table IV, soaks at around 1000° C. do not extract much $B_2O_3$. Soaks in $H_2$/He above 1600° C. permitted coarsening via $B_2O_3$ prior to reaching the soaking temperature, 2230° C. Significantly, the data in Table IV suggests that 10% $H_2$ atmosphere results in specimens with higher relative density than atmosphere richer in $H_2$.

Referring to Table V, the data indicates that higher concentrations of $H_2$ during the soak at 1350° C. are effective in densifying the $B_4C$ if enough time is allowed for purging the $H_2$ by flowing He prior to rapidly heating the $B_4C$ into higher temperatures in which sintering occurs.

Referring to Table VI, vacuum instead of flowing $H_2$/He can also be used to remove $B_2O_3$.

Figure 9:
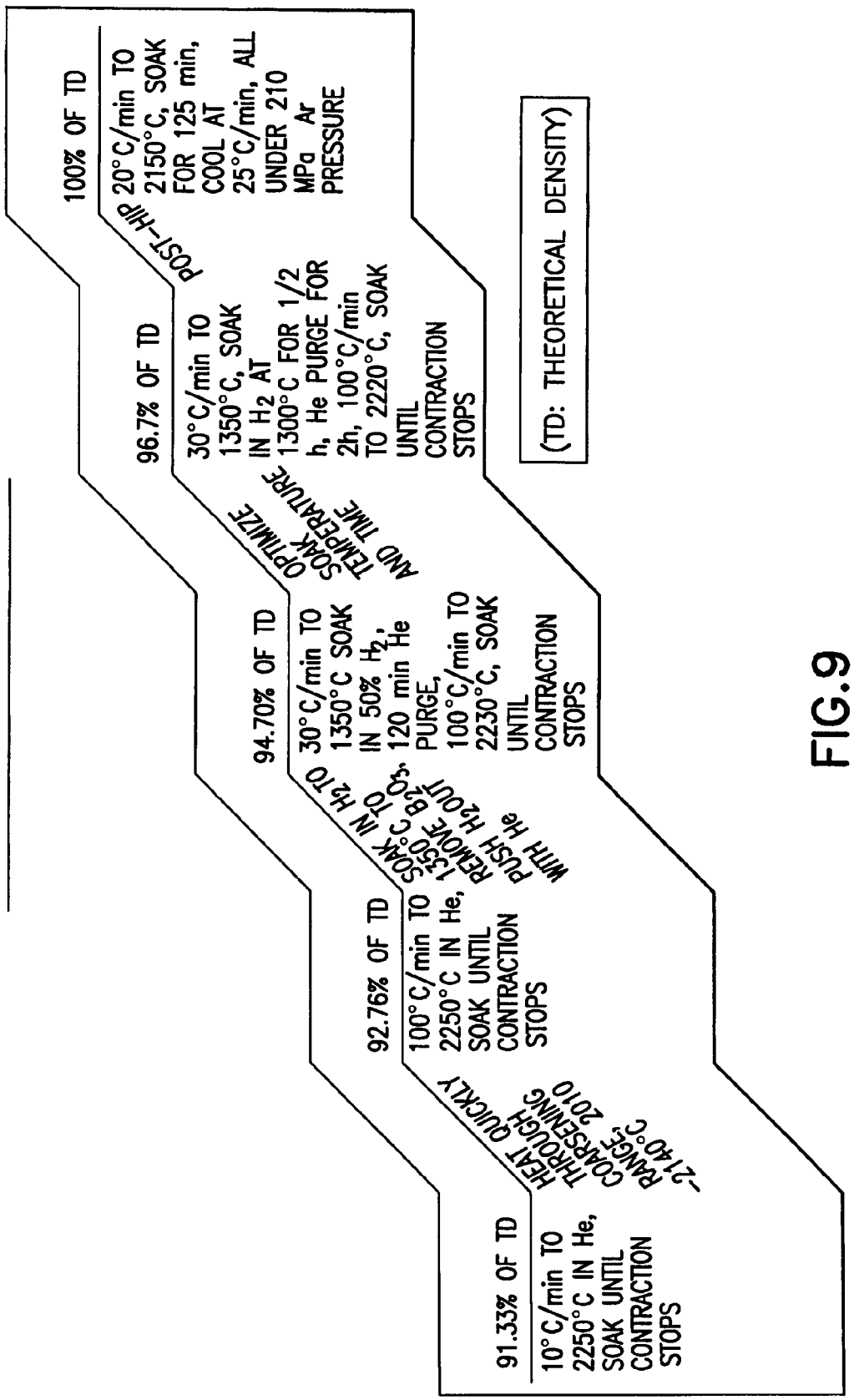
FIG. 9 summarizes the results of the studies detailed in the specification.

FIG. 9 summarizes the advantages of a method according to the present invention.

Conclusions

Using the hydrogen-based $B_2O_3$ removal method, the pressureless sintered relative density of undoped $B_4C$ can be increased from 94.7 to 96.7% by optimizing the soaking temperature, and soaking time. Soaking times longer than those required for near-termination of densification (i.e. shrinkage rates less than 0.005%/min) resulted in degradation in relative density and hardness. XRD results showed that soaking at and above 2317° C. resulted in an increase in graphite concentration, and decomposition of the $B_4C$ phase occurred after soaking at 2336° C. Green density in the direction of minimum surface to center heat transfer path is believed to be an important parameter to the pressureless sintered relative density. Post-HIPing pressureless sintered $B_4C$ did not result in changes in the $B_4C$ structure or concentration of graphite, and resulted in substantial increases in relative density (e.g. 100%) and Vickers hardness, so long as the pressureless sintered density was greater than 93.0%. In comparison to a commercial HPed $B_4C$ specimen, optimized pressureless sintered relative densities were lower but the Vickers hardnesses were comparable. Post-HIPed pressureless sintered $B_4C$ specimens had higher relative densities, lower graphite contents, and higher Vickers hardnesses than commercial hot-pressed $B_4C$.

Applications

A method according to the present invention can be used to fabricate $B_4C$ based articles by pressureless sintering without using sintering agents, which tend to have adverse effects on the mechanical properties of the sintered $B_4C$. Pressureless sintering, unlike HPing, allows for the fabrication of complex shapes without the need for significant shaping-related activity after sintering. For example, using the methods disclosed herein, $B_4C$ based inserts can be fabricated for body armor parts. Advantageously, unlike HPed parts, parts fabricated according to the present invention can have complex shapes. Thus, inserts for body armor parts can be fabricated to be form-fitting meaning that the parts so fabricated can follow the complex countours of a human.

Figure 10A:
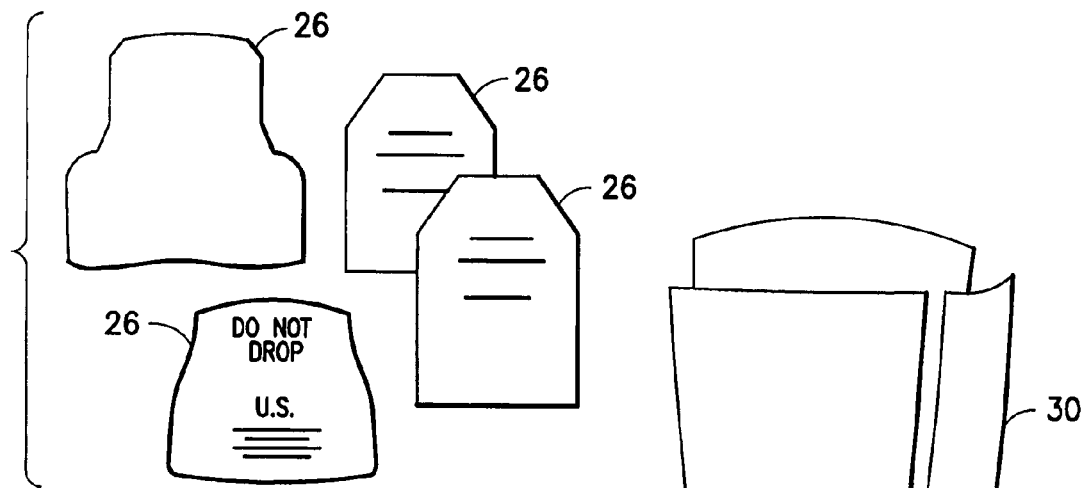
FIG. 10A-10F show examples of articles which can be produced using the method of the present invention.

Referring to FIG. 10A, using the method disclosed herein, a $B_4C$ based insert 26 can be fabricated for thorax protection which generally follows the contours of the thorax of a human body. Thus, for example, an insert can be fabricated that generally follows the contours of the body of a female human, or a male human.

Figure 10B:
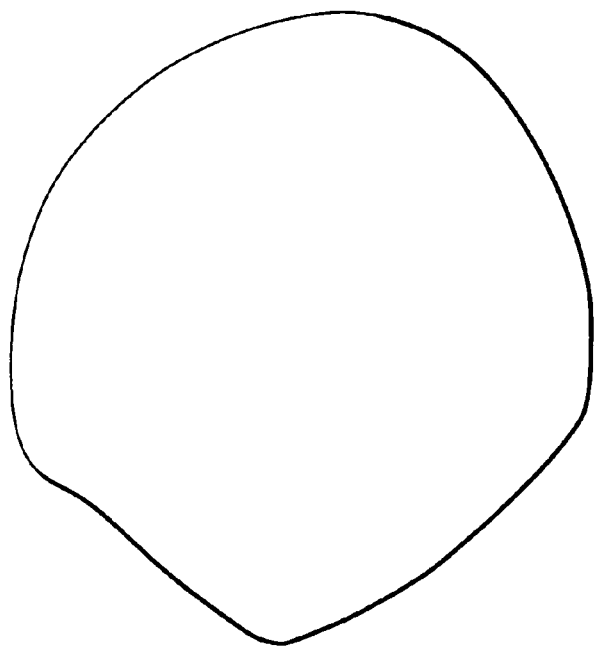

Referring to FIG. 10B, using the method disclosed herein, a $B_4C$ based insert 28 can be fabricated to fit inside a helmet which generally follows the contours of the outer surface of a human skull. It is estimated that an insert of 0.2" thick can be as light as 1.5 pounds.

Figure 10C:
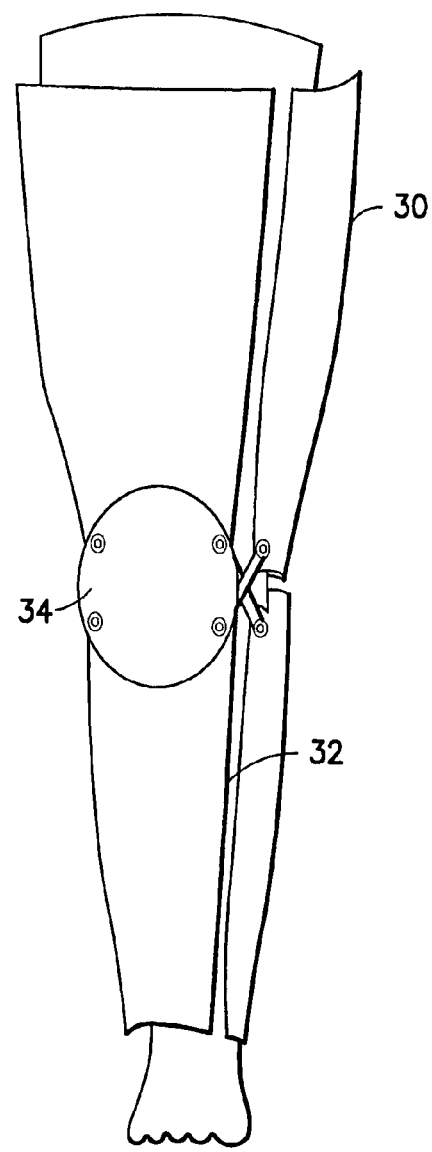

Referring to FIG. 10C, using the method disclosed herein, a $B_4C$ based insert can be fabricated for limb protection which generally follows the contours of a portion of a limb of a human body. Thus, for example, an insert can be fabricated that generally follows the contours of the thigh 30, a shin 32, or a knee 34 portion of a human body.

Figure 10D:
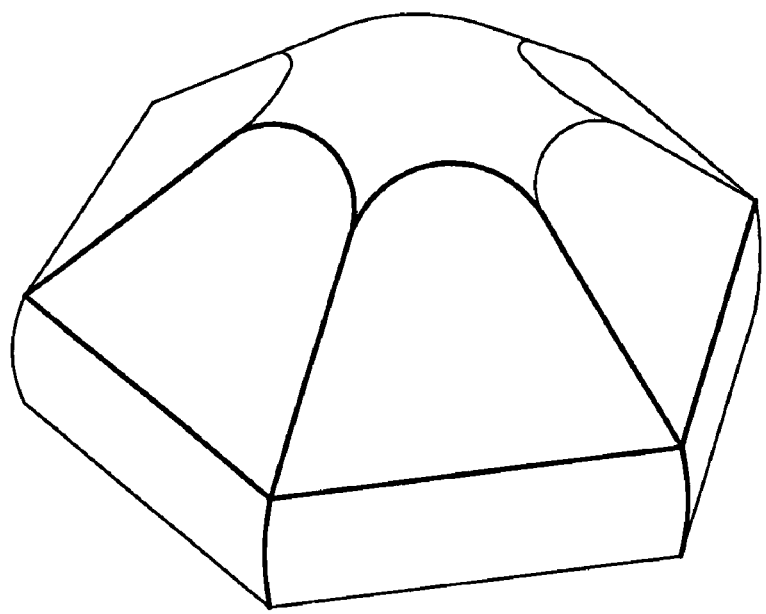

An insert according to the present invention, unlike armor inserts of the prior art, is a monolithic, one-piece body, rather than an armor part that is made from small tiles or the like flat plates that are supported on a backing material. It is, therefore, expected that a part fabricated according to the present invention will have superior ballistic properties. The present invention, however, can be used to form ballistic tiles. An example of such a tile is shown in FIG. 10D.

Figure 10E:
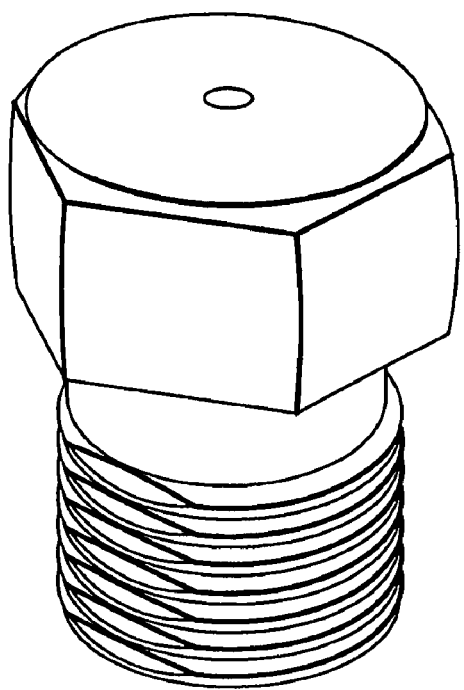

An article fabricated by a method according to the present invention is not limited to ballistic application. For example, a nozzle for slurry pumping and grit blasting having excellent abrasion resistance can be fabricated without significant post-fabrication shaping-related activities such as machining. An example of such a nozzle is shown in FIG. 10E.

Figure 10F:
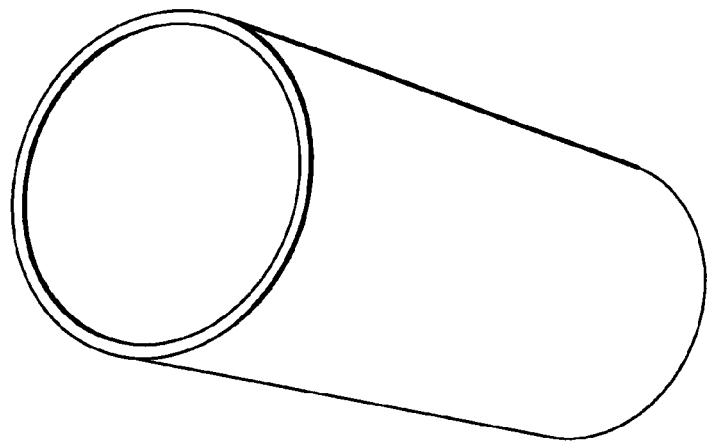
Figure 10F:
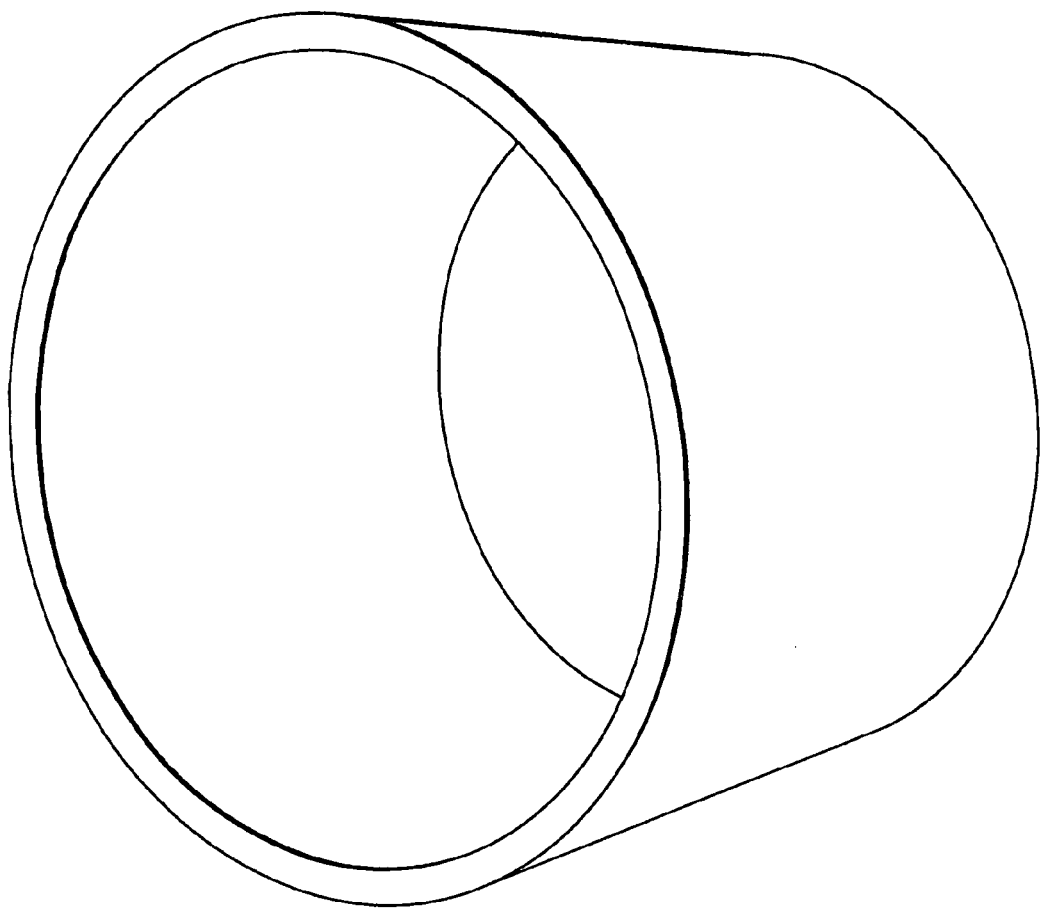

A process according to the present invention can be used to form other complex shapes. For example, as seen in FIG. 10F, crucibles can be formed using a process according to the present invention.

A $B_4C$ article produced according to the present invention can also be used in vehicle and aircraft armor. In both cases, and specifically in the case of an aircraft, the weight of the armor is an important factor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of preparing a boron carbide article comprising:
    forming a boron carbide green body from undoped boron carbide particles coated by boron oxide;
    driving said boron oxide out of said boron carbide green body at a removal temperature higher than 1100° C. and lower than 1400° C. to obtain a reduced boron carbide body;
    pressureless sintering said reduced boron carbide body at a pressureless soaking temperature selected from the range 2200° C.-2317° C. for a soak time that is no longer than required for said reduced boron carbide body to reach a shrinkage rate of 0.005% per minute followed by cooling said reduced boron carbide body to obtain a pressureless sintered boron carbide body having a relative density of at least 93%; and
    hot isostatically pressing said pressureless sintered boron carbide body at a temperature of at least 2000° C.

2. The method of claim 1, wherein said pressureless sintered boron carbide body is hot isostatically pressed at a gas pressure at or below 310 MPa and at or above 69 MPa for at least 125 minutes to obtain a hot isostatically pressed boron carbide body having a relative density that is higher than 99%.

3. The method of claim 1, wherein said boron oxide is driven by exposing said boron carbide green body to a flowing $H_2$—He gas mixture at said removal temperature for a first period of time followed by soaking said green body in flowing He for another second period of time.

4. The method of claim 1, wherein said boron carbide green body is heated from said removal temperature to said pressureless soaking temperature at a rate of 50° C./minute or higher.

5. The method of claim 1, wherein said boron carbide body is sintered according to the following, soak time=0.6622 (soak temperature)−1417.7 in which soak time is in minutes and soak temperature is in degrees C.

6. The method of claim 1, wherein said pressureless sintered boron carbide body is hot isostatically pressed at 2150° C.

7. The method of claim 1, wherein said boron carbide green body has a relative density of 64%-70%.

8. The method of claim 1, wherein said pressureless sintered boron carbide body has a relative density in the range of about 93%-96.7%.

9. The method of claim 1, wherein said boron carbide green body is heated to said pressureless soaking temperature at a rate of at least 100° C. per minute.

10. The method of claim 1, wherein said average grain size of said pressureless sintered boron carbide body is less than 5 microns.

11. The method of claim 1, wherein said boron carbide article is a form-fitting personal armor part.

12. The method of claim 11, wherein said personal armor part is a helmet.

13. The method of claim 11, wherein said personal armor part is for thorax protection.

14. The method of claim 12, wherein said personal armor part is for limb protection.

15. The method of claim 1, wherein said article is a nozzle.

16. The method of claim 15, wherein said nozzle is for applying an abrasive slurry or other aqueous particle suspension.

17. The method of claim 1, wherein said article is used as armor in an aircraft or a vehicle.

18. A method of preparing a boron carbide article comprising:
   forming a boron carbide green body of a relative density of more than 60% from undoped boron carbide particles coated by boron oxide;
   driving said boron oxide out of said boron carbide green body to obtain a reduced boron carbide body;
   pressureless sintering said reduced boron carbide body at a pressureless soaking temperature selected from the range 2200° C.-2317° C. for a period of time that is no longer than required for said reduced boron carbide body to reach a shrinkage rate of 0.005% per minute followed by cooling said sintered boron carbide body to obtain a pressureless sintered boron carbide body of at least 93% relative density; and
   hot isostatically pressing said pressureless sintered boron carbide body at a temperature of at least 2000° C.

19. The method of claim 18, wherein said pressureless sintered boron carbide body is hot isostatically pressed at a pressure at or below 310 MPa.

20. The method of claim 19, wherein said pressureless sintered boron carbide body is hot isostatically pressed at pressure equal to or above 69 MPa.

21. The method of claim 18, wherein said boron carbide green body is formed to have a relative density of at least 64%.

22. The method of claim 18, wherein said boron carbide green body is formed to have a relative density of between 64% and 71%.

23. The method of claim 18, wherein said pressureless sintered boron carbide body is hot isostatically pressed at a temperature that does not exceed 2150° C.

24. The method of claim 18, wherein said pressureless sintered boron carbide body is hot isostatically pressed to a relative density of at least 99%.

25. The method of claim 18, wherein said boron carbide green body is formed by cold isostatic pressing.

* * * * *